(12) United States Patent
Cristofalo

(10) Patent No.: US 7,305,691 B2
(45) Date of Patent: Dec. 4, 2007

(54) SYSTEM AND METHOD FOR PROVIDING TARGETED PROGRAMMING OUTSIDE OF THE HOME

(75) Inventor: Michael Cristofalo, Doylestown, PA (US)

(73) Assignee: ACTV, Inc., New York, NY (US)

( * ) Notice: Subject to any disclaimer, the term of this patent is extended or adjusted under 35 U.S.C. 154(b) by 919 days.

(21) Appl. No.: 09/851,030

(22) Filed: May 7, 2001

(65) Prior Publication Data

US 2002/0166119 A1 Nov. 7, 2002

(51) Int. Cl.
*H04N 7/025* (2006.01)
*H04N 5/455* (2006.01)
*H04N 7/18* (2006.01)

(52) U.S. Cl. .......................... 725/34; 725/35; 725/46; 725/81; 725/153

(58) Field of Classification Search ................ 725/32, 725/34, 35, 46, 86, 89, 134, 81; 707/4, 10; 709/201; 455/456.1, 456.3
See application file for complete search history.

(56) References Cited

U.S. PATENT DOCUMENTS

| | | |
|---|---|---|
| 2,612,553 A | 9/1952 | Homrighous |
| 2,777,901 A | 1/1957 | Dostert |
| 2,826,828 A | 3/1958 | Hamilton |
| 2,908,767 A | 10/1959 | Fritzinger |
| 2,921,385 A | 1/1960 | Hamilton |
| 3,008,000 A | 11/1961 | Morchand |
| 3,020,360 A | 2/1962 | Gratian et al. |
| 3,194,895 A | 7/1965 | Treadwell |
| 3,221,098 A | 11/1965 | Feldman et al. |
| 3,245,157 A | 4/1966 | Laviana |
| 3,255,536 A | 6/1966 | Livingston |
| 3,273,260 A | 9/1966 | Walker |
| 3,284,923 A | 11/1966 | Leslie |

(Continued)

FOREIGN PATENT DOCUMENTS

AU 717399 7/2000

(Continued)

OTHER PUBLICATIONS

"Overview," located at www.claria.com/companyinfo/ visited on Feb. 8, 2005.

(Continued)

*Primary Examiner*—Kieu-Oanh Bui
(74) *Attorney, Agent, or Firm*—Marc S. Kaufman; Nixon Peabody LLP

(57) ABSTRACT

A system and method for providing targeted programming to a user outside of the user's home. The method of receiving at least one of a user identification and a user profile, selecting a program based at least in part on the at least one of the user identification and the user profile, and providing a program for presentation to a user outside of the user's home is disclosed. A system including presentation device connected to a controller is also disclosed. The controller receives at least one of a user identification and a user profile, obtains a program based at least in part on the at least one of the user identification and the user profile and provides a program to a presentation device for presentation to a user outside of the user's home.

72 Claims, 8 Drawing Sheets

U.S. PATENT DOCUMENTS

| | | |
|---|---|---|
| 3,343,280 A | 9/1967 | Tolnai |
| 3,366,731 A | 1/1968 | Wallerstein |
| 3,387,084 A | 6/1968 | Hine et al. |
| 3,440,342 A | 4/1969 | Beltrami |
| 3,477,144 A | 11/1969 | Stillit |
| 3,484,950 A | 12/1969 | Serrell et al. |
| 3,485,946 A | 12/1969 | Jackson et al. |
| 3,538,621 A | 11/1970 | Mayeda |
| 3,546,791 A | 12/1970 | Koos et al. |
| 3,566,482 A | 3/1971 | Morchand |
| 3,575,861 A | 4/1971 | Pratt et al. |
| 3,602,582 A | 8/1971 | Torricelli |
| 3,623,238 A | 11/1971 | Laplume et al. |
| 3,643,217 A | 2/1972 | Morphew et al. |
| 3,665,615 A | 5/1972 | Laplume |
| 3,708,891 A | 1/1973 | Rosov |
| 3,725,571 A | 4/1973 | Justice |
| 3,730,980 A | 5/1973 | Kirk, Jr. |
| 3,757,225 A | 9/1973 | Ulicki |
| 3,763,377 A | 10/1973 | Weston |
| 3,763,577 A | 10/1973 | Goodson |
| 3,774,316 A | 11/1973 | Meier |
| 3,814,841 A | 6/1974 | Ulicki |
| 3,825,674 A | 7/1974 | Justice |
| 3,833,760 A | 9/1974 | Tickle |
| 3,849,594 A | 11/1974 | Justice |
| 3,857,999 A | 12/1974 | Justice |
| 3,860,745 A | 1/1975 | Takada |
| 3,902,007 A | 8/1975 | Justice |
| 3,916,092 A | 10/1975 | Justice |
| 3,936,595 A | 2/1976 | Yanagimachi et al. |
| 3,947,972 A | 4/1976 | Freeman |
| 3,988,528 A | 10/1976 | Yanagimachi et al. |
| 3,991,266 A | 11/1976 | Baer |
| 4,034,990 A | 7/1977 | Baer |
| 4,040,088 A | 8/1977 | Hannan |
| 4,044,380 A | 8/1977 | Justice et al. |
| 4,078,316 A | 3/1978 | Freeman |
| 4,199,781 A | 4/1980 | Doumit |
| 4,245,245 A | 1/1981 | Matsumoto et al. |
| 4,264,924 A | 4/1981 | Freeman |
| 4,264,925 A | 4/1981 | Freeman et al. |
| 4,290,142 A | 9/1981 | Schnee et al. |
| 4,292,649 A | 9/1981 | Macheboeuf |
| 4,305,131 A | 12/1981 | Best |
| 4,331,974 A | 5/1982 | Cogswell et al. |
| 4,333,152 A | 6/1982 | Best |
| 4,361,730 A | 11/1982 | Barber et al. |
| 4,381,522 A | 4/1983 | Lambert |
| 4,399,329 A | 8/1983 | Wharton |
| 4,422,105 A | 12/1983 | Rodesch et al. |
| 4,439,784 A | 3/1984 | Furukawa et al. |
| 4,445,137 A | 4/1984 | Panofsky |
| 4,445,187 A | 4/1984 | Best |
| 4,507,680 A | 3/1985 | Freeman |
| 4,516,156 A | 5/1985 | Fabris et al. |
| 4,530,008 A | 7/1985 | McVoy |
| 4,536,791 A | 8/1985 | Campbell et al. |
| 4,546,382 A | 10/1985 | McKenna et al. |
| 4,555,730 A | 11/1985 | Briggs |
| 4,569,026 A | 2/1986 | Best |
| 4,571,640 A | 2/1986 | Baer |
| 4,572,509 A | 2/1986 | Sitrick |
| 4,573,072 A | 2/1986 | Freeman |
| 4,574,305 A | 3/1986 | Campbell et al. |
| 4,591,248 A | 5/1986 | Freeman |
| 4,592,546 A | 6/1986 | Fascenda et al. |
| 4,599,611 A | 7/1986 | Bowker et al. |
| 4,602,279 A | 7/1986 | Freeman |
| 4,616,261 A | 10/1986 | Crawford et al. |
| 4,625,235 A | 11/1986 | Watson |
| 4,635,132 A | 1/1987 | Nakamura |
| 4,644,515 A | 2/1987 | Allebest et al. |
| 4,647,980 A | 3/1987 | Steventon et al. |
| 4,665,431 A | 5/1987 | Cooper |
| 4,694,490 A | 9/1987 | Harvey et al. |
| 4,701,896 A | 10/1987 | Allebest et al. |
| 4,704,725 A | 11/1987 | Harvey et al. |
| 4,706,121 A | 11/1987 | Young et al. |
| 4,730,188 A * | 3/1988 | Milheiser .................... 340/825 |
| 4,733,301 A | 3/1988 | Wright, Jr. |
| 4,734,764 A | 3/1988 | Pocock et al. |
| 4,750,036 A | 6/1988 | Martinez |
| 4,763,317 A | 8/1988 | Lehman et al. |
| 4,768,087 A | 8/1988 | Taub et al. |
| 4,777,529 A | 10/1988 | Schultz |
| 4,780,757 A | 10/1988 | Bryer et al. |
| 4,780,758 A | 10/1988 | Lin et al. |
| RE32,776 E | 11/1988 | Saylor |
| 4,785,349 A | 11/1988 | Keith et al. |
| 4,786,967 A | 11/1988 | Smith, III et al. |
| 4,807,031 A | 2/1989 | Broughton et al. |
| 4,816,905 A | 3/1989 | Tweedy et al. |
| 4,821,101 A | 4/1989 | Short |
| 4,839,743 A | 6/1989 | Best et al. |
| 4,846,693 A | 7/1989 | Baer |
| 4,847,690 A | 7/1989 | Perkins |
| 4,847,698 A | 7/1989 | Freeman |
| 4,847,699 A | 7/1989 | Freeman |
| 4,847,700 A | 7/1989 | Freeman |
| 4,855,827 A | 8/1989 | Best |
| 4,862,268 A | 8/1989 | Campbell et al. |
| 4,870,591 A | 9/1989 | Cicciarelli et al. |
| 4,875,096 A | 10/1989 | Baer et al. |
| 4,876,592 A | 10/1989 | Von Kohorn |
| 4,877,408 A | 10/1989 | Hartsfield |
| 4,884,974 A | 12/1989 | DeSmet |
| 4,894,789 A | 1/1990 | Yee |
| 4,905,094 A | 2/1990 | Pocock et al. |
| 4,916,633 A | 4/1990 | Tychonievich et al. |
| 4,918,516 A | 4/1990 | Freeman |
| 4,918,620 A | 4/1990 | Ulug |
| 4,924,303 A | 5/1990 | Brandon et al. |
| 4,926,255 A | 5/1990 | Von Kohorn |
| 4,930,019 A | 5/1990 | Chu |
| 4,931,865 A | 6/1990 | Scarampi |
| 4,941,040 A | 7/1990 | Pocock et al. |
| 4,949,170 A | 8/1990 | Yanagidaira et al. |
| 4,965,825 A | 10/1990 | Harvey et al. |
| 4,967,368 A | 10/1990 | Bolling et al. |
| 4,972,328 A | 11/1990 | Wu et al. |
| 4,975,771 A | 12/1990 | Kassatly |
| 4,987,486 A | 1/1991 | Johnson et al. |
| 4,988,111 A | 1/1991 | Gerlitz et al. |
| 4,989,233 A | 1/1991 | Schakowsky et al. |
| 4,989,234 A | 1/1991 | Schakowsky et al. |
| 4,991,011 A | 2/1991 | Johnson et al. |
| 4,994,908 A | 2/1991 | Kuban et al. |
| 4,995,036 A | 2/1991 | Copen et al. |
| 5,001,554 A | 3/1991 | Johnson et al. |
| 5,010,400 A | 4/1991 | Oto |
| 5,010,500 A | 4/1991 | Makkuni et al. |
| 5,014,125 A | 5/1991 | Pocock et al. |
| 5,023,707 A | 6/1991 | Briggs |
| 5,027,400 A | 6/1991 | Baji et al. |
| 5,033,969 A | 7/1991 | Kamimura |
| 5,034,807 A | 7/1991 | Von Kohorn |
| 5,043,891 A | 8/1991 | Goldstein et al. |
| 5,051,822 A | 9/1991 | Rhoades |
| 5,053,883 A | 10/1991 | Johnson |
| 5,055,924 A | 10/1991 | Skutta |
| 5,057,915 A | 10/1991 | Von Kohorn |
| 5,068,733 A | 11/1991 | Bennett |
| 5,077,607 A | 12/1991 | Johnson et al. |

| | | | | | |
|---|---|---|---|---|---|
| 5,090,708 A | 2/1992 | Gerlitz et al. | 5,572,442 A | 11/1996 | Schulof et al. |
| 5,093,718 A | 3/1992 | Hoarty et al. | 5,579,055 A | 11/1996 | Hamilton et al. |
| 5,109,414 A | 4/1992 | Harvey et al. | 5,585,858 A | 12/1996 | Harper et al. |
| 5,109,482 A | 4/1992 | Bohrman | 5,586,257 A | 12/1996 | Perlman |
| 5,114,155 A | 5/1992 | Tillery et al. | 5,586,937 A | 12/1996 | Menashe |
| 5,128,752 A | 7/1992 | Von Kohorn | 5,589,892 A | 12/1996 | Knee et al. |
| 5,132,992 A | 7/1992 | Yurt | 5,593,349 A | 1/1997 | Miguel et al. |
| 5,133,079 A | 7/1992 | Ballantyne et al. | 5,594,492 A | 1/1997 | O'Callaghan et al. |
| 5,140,419 A | 8/1992 | Galumbeck et al. | 5,594,935 A | 1/1997 | Reber et al. |
| 5,157,491 A | 10/1992 | Kassatly | 5,600,363 A | 2/1997 | Anzaki et al. |
| 5,174,759 A | 12/1992 | Preston et al. | 5,600,364 A | 2/1997 | Hendricks et al. |
| 5,176,520 A | 1/1993 | Hamilton | 5,600,366 A | 2/1997 | Schulman |
| 5,177,604 A | 1/1993 | Martinez | 5,600,368 A | 2/1997 | Matthews et al. |
| 5,181,107 A | 1/1993 | Rhoades | 5,600,573 A | 2/1997 | Hendricks et al. |
| 5,182,642 A | 1/1993 | Gersdorff et al. | 5,603,078 A | 2/1997 | Henderson et al. |
| 5,189,630 A | 2/1993 | Barstow et al. | 5,604,542 A | 2/1997 | Dedrick |
| 5,191,410 A | 3/1993 | McCalley et al. | 5,610,653 A | 3/1997 | Abecassis |
| 5,208,659 A | 5/1993 | Rhodes | 5,610,661 A | 3/1997 | Bhatt |
| 5,210,611 A | 5/1993 | Yee et al. | 5,612,730 A | 3/1997 | Lewis |
| 5,220,420 A | 6/1993 | Hoarty et al. | 5,612,900 A | 3/1997 | Azadegan et al. |
| 5,227,874 A | 7/1993 | Von Kohorn | 5,613,909 A | 3/1997 | Stelovsky |
| 5,231,494 A | 7/1993 | Wachob | RE35,498 E | 4/1997 | Barnard |
| RE34,340 E | 8/1993 | Freeman | 5,627,978 A | 5/1997 | Altom et al. |
| 5,236,199 A | 8/1993 | Thompson, Jr. | 5,633,810 A | 5/1997 | Mandal et al. |
| 5,239,463 A | 8/1993 | Blair et al. | 5,633,918 A | 5/1997 | Mankovitz |
| 5,239,617 A | 8/1993 | Gardner et al. | 5,637,844 A | 6/1997 | Eiba |
| 5,243,528 A | 9/1993 | Lefebvre | 5,640,193 A | 6/1997 | Wellner |
| 5,247,347 A | 9/1993 | Litteral et al. | 5,643,088 A | 7/1997 | Vaughn et al. |
| 5,261,820 A | 11/1993 | Slye et al. | 5,649,284 A | 7/1997 | Yoshinobu |
| 5,262,860 A | 11/1993 | Fitzpatrick et al. | 5,652,615 A | 7/1997 | Bryant et al. |
| 5,263,723 A | 11/1993 | Pearson et al. | 5,659,366 A | 8/1997 | Kerman |
| 5,264,933 A | 11/1993 | Rosser et al. | 5,666,293 A | 9/1997 | Metz et al. |
| 5,282,028 A | 1/1994 | Johnson et al. | 5,667,708 A | 9/1997 | Glass et al. |
| 5,285,278 A | 2/1994 | Holman | 5,668,592 A | 9/1997 | Spaulding, II |
| 5,291,486 A | 3/1994 | Koyanagi | 5,677,708 A | 10/1997 | Matthews, III et al. |
| 5,318,450 A | 6/1994 | Carver | 5,679,075 A | 10/1997 | Forrest et al. |
| 5,340,317 A | 8/1994 | Freeman | 5,682,597 A | 10/1997 | Ganek et al. |
| 5,353,283 A | 10/1994 | Tsuchiya | 5,686,954 A | 11/1997 | Yoshinobu et al. |
| 5,357,276 A | 10/1994 | Banker et al. | 5,691,986 A | 11/1997 | Pearlstein |
| 5,359,510 A | 10/1994 | Sabaliauskas | 5,692,214 A | 11/1997 | Levine |
| 5,365,346 A | 11/1994 | Abumi | 5,694,163 A | 12/1997 | Harrison |
| 5,388,197 A | 2/1995 | Rayner | 5,695,400 A | 12/1997 | Fennell, Jr. et al. |
| 5,404,393 A | 4/1995 | Remillard | 5,696,905 A | 12/1997 | Reimer et al. |
| 5,405,152 A | 4/1995 | Katanics et al. | 5,697,844 A | 12/1997 | Von Kohorn |
| 5,412,416 A | 5/1995 | Nemirofsky | 5,710,884 A | 1/1998 | Dedrick |
| 5,412,720 A | 5/1995 | Hoarty et al. | 5,721,827 A | 2/1998 | Logan et al. |
| 5,438,355 A | 8/1995 | Palmer | 5,724,091 A | 3/1998 | Freeman et al. |
| 5,442,389 A | 8/1995 | Blahut et al. | 5,724,103 A | 3/1998 | Batchelor |
| 5,444,499 A | 8/1995 | Saitoh | 5,724,521 A | 3/1998 | Dedrick |
| 5,453,794 A | 9/1995 | Ezaki | 5,724,567 A | 3/1998 | Rose et al. |
| 5,454,722 A | 10/1995 | Holland et al. | 5,729,252 A | 3/1998 | Fraser |
| 5,455,910 A | 10/1995 | Johnson et al. | 5,729,471 A | 3/1998 | Jain et al. |
| 5,462,275 A | 10/1995 | Lowe et al. | 5,730,654 A | 3/1998 | Brown |
| 5,467,288 A | 11/1995 | Fasciano et al. | 5,734,413 A | 3/1998 | Lappington et al. |
| 5,479,268 A | 12/1995 | Young et al. | 5,734,437 A | 3/1998 | Back |
| 5,481,542 A | 1/1996 | Logston et al. | 5,734,589 A | 3/1998 | Kostreski et al. |
| 5,488,411 A | 1/1996 | Lewis et al. | 5,745,126 A | 4/1998 | Jain et al. |
| 5,498,000 A | 3/1996 | Cuneo | 5,745,481 A | 4/1998 | Phillips et al. |
| 5,502,497 A | 3/1996 | Yamaashi et al. | 5,748,186 A | 5/1998 | Raman |
| 5,526,035 A | 6/1996 | Lappington et al. | 5,748,731 A | 5/1998 | Shephard |
| 5,526,478 A | 6/1996 | Russell, Jr. et al. | 5,757,916 A | 5/1998 | MacDoran et al. |
| 5,532,748 A | 7/1996 | Naimpally | 5,758,079 A | 5/1998 | Ludwig et al. |
| 5,534,913 A | 7/1996 | Majeti et al. | 5,758,257 A | 5/1998 | Herz et al. |
| 5,534,944 A | 7/1996 | Egawa et al. | 5,759,101 A | 6/1998 | Von Kohorn |
| 5,537,141 A | 7/1996 | Harper et al. | 5,761,602 A | 6/1998 | Wagner et al. |
| 5,539,471 A | 7/1996 | Myhrvold et al. | 5,761,606 A | 6/1998 | Wolzien |
| 5,541,662 A | 7/1996 | Adams et al. | 5,771,307 A | 6/1998 | Lu et al. |
| 5,543,849 A | 8/1996 | Long | 5,771,381 A | 6/1998 | Jones et al. |
| 5,553,221 A | 9/1996 | Reimer et al. | 5,774,664 A | 6/1998 | Hidary et al. |
| 5,557,316 A | 9/1996 | Hoarty et al. | 5,778,181 A | 7/1998 | Hidary et al. |
| 5,557,724 A | 9/1996 | Sampat et al. | 5,778,182 A | 7/1998 | Cathey et al. |
| 5,564,073 A | 10/1996 | Takahisa | 5,779,549 A | 7/1998 | Walker et al. |
| 5,570,295 A | 10/1996 | Isenberg et al. | 5,782,692 A | 7/1998 | Stelovsky |

| | | | | | |
|---|---|---|---|---|---|
| 5,784,055 A | 7/1998 | Ngai | 6,016,158 A | 1/2000 | Mackinnon |
| 5,786,869 A | 7/1998 | Back et al. | 6,018,764 A | 1/2000 | Field et al. |
| 5,790,176 A | 8/1998 | Craig | 6,018,768 A | 1/2000 | Ullman et al. |
| 5,793,365 A | 8/1998 | Tang et al. | 6,023,729 A | 2/2000 | Samuel et al. |
| 5,796,393 A | 8/1998 | MacNaughton et al. | 6,026,375 A | 2/2000 | Hall et al. |
| 5,796,952 A | 8/1998 | Davis et al. | 6,026,376 A | 2/2000 | Kenney |
| 5,801,750 A | 9/1998 | Kurihara | 6,029,045 A | 2/2000 | Picco et al. |
| 5,813,006 A | 9/1998 | Polnerow et al. | 6,029,172 A | 2/2000 | Jorna et al. |
| 5,818,441 A | 10/1998 | Throckmorton | 6,029,195 A | 2/2000 | Herz |
| 5,819,261 A | 10/1998 | Takahashi et al. | 6,038,000 A | 3/2000 | Hurst, Jr. |
| 5,823,879 A | 10/1998 | Goldberg et al. | 6,044,403 A | 3/2000 | Gerszberg et al. |
| 5,825,829 A | 10/1998 | Boraziani et al. | 6,047,235 A | 4/2000 | Hiyokawa et al. |
| 5,828,421 A | 10/1998 | Boyce et al. | 6,049,821 A | 4/2000 | Theriault et al. |
| 5,832,496 A | 11/1998 | Anand et al. | 6,055,569 A | 4/2000 | O'Brien et al. |
| 5,846,132 A | 12/1998 | Junkin | 6,057,856 A | 5/2000 | Miyashita et al. |
| 5,848,373 A | 12/1998 | DeLorme et al. | 6,058,430 A | 5/2000 | Kaplan |
| 5,848,396 A | 12/1998 | Gerace | 6,061,738 A | 5/2000 | Osaku et al. |
| 5,848,397 A | 12/1998 | Marsh et al. | 6,064,438 A | 5/2000 | Miller |
| 5,855,516 A | 1/1999 | Eiba | 6,064,973 A | 5/2000 | Smith et al. |
| 5,861,881 A | 1/1999 | Freeman et al. | 6,065,059 A | 5/2000 | Shieh et al. |
| 5,864,823 A | 1/1999 | Levitan | 6,070,149 A | 5/2000 | Tavor et al. |
| 5,867,208 A | 2/1999 | McLaren | 6,072,521 A | 6/2000 | Harrison et al. |
| 5,870,558 A | 2/1999 | Branton, Jr. et al. | 6,075,527 A | 6/2000 | Ichihashi et al. |
| 5,878,222 A | 3/1999 | Harrison | 6,075,971 A | 6/2000 | Williams et al. |
| 5,878,223 A | 3/1999 | Becker et al. | 6,080,063 A | 6/2000 | Khosla |
| 5,880,720 A | 3/1999 | Iwafune et al. | 6,081,780 A | 6/2000 | Lumelksy |
| 5,889,950 A | 3/1999 | Kuzma | 6,081,830 A | 6/2000 | Schindler |
| 5,889,951 A | 3/1999 | Lombardi | 6,082,887 A | 7/2000 | Feuer et al. |
| 5,890,906 A | 4/1999 | Macri et al. | 6,094,677 A | 7/2000 | Capek et al. |
| 5,890,963 A | 4/1999 | Yen | 6,098,085 A | 8/2000 | Blonder et al. |
| 5,892,909 A | 4/1999 | Grasso et al. | 6,101,180 A | 8/2000 | Donahue et al. |
| 5,894,556 A | 4/1999 | Grimm et al. | 6,101,486 A | 8/2000 | Roberts et al. |
| 5,905,865 A | 5/1999 | Palmer et al. | 6,102,797 A | 8/2000 | Kail |
| 5,907,322 A | 5/1999 | Kelly et al. | 6,102,969 A | 8/2000 | Christianson et al. |
| 5,907,680 A | 5/1999 | Nielsen | 6,104,443 A | 8/2000 | Adcock et al. |
| 5,912,700 A | 6/1999 | Honey et al. | 6,108,703 A | 8/2000 | Leighton et al. |
| 5,913,040 A | 6/1999 | Rakavy et al. | 6,112,181 A | 8/2000 | Shear et al. |
| 5,917,725 A | 6/1999 | Thacher et al. | 6,112,212 A | 8/2000 | Heitler |
| 5,917,830 A | 6/1999 | Chen et al. | 6,119,165 A | 9/2000 | Li et al. |
| 5,918,009 A | 6/1999 | Gehani et al. | 6,122,647 A | 9/2000 | Horowitz et al. |
| 5,918,014 A | 6/1999 | Robinson | 6,122,658 A | 9/2000 | Chaddha |
| 5,926,179 A | 7/1999 | Matsuda et al. | 6,126,547 A | 10/2000 | Ishimoto et al. |
| 5,929,849 A | 7/1999 | Kikinis | 6,128,482 A | 10/2000 | Nixon et al. |
| 5,929,850 A | 7/1999 | Broadwin et al. | 6,131,120 A | 10/2000 | Reid |
| 5,930,493 A | 7/1999 | Ottesen et al. | 6,134,584 A | 10/2000 | Chang et al. |
| 5,933,822 A | 8/1999 | Branden-Harder et al. | 6,138,144 A | 10/2000 | DeSimone et al. |
| 5,937,329 A | 8/1999 | Helmy et al. | 6,141,010 A | 10/2000 | Hoyle |
| 5,937,331 A | 8/1999 | Kalluri et al. | 6,144,848 A | 11/2000 | Walsh et al. |
| 5,940,082 A | 8/1999 | Brinegar et al. | 6,144,991 A | 11/2000 | England |
| 5,940,595 A | 8/1999 | Reber et al. | 6,151,626 A | 11/2000 | Tims et al. |
| 5,941,774 A | 8/1999 | Takemoto et al. | 6,157,953 A | 12/2000 | Chang et al. |
| 5,947,747 A | 9/1999 | Walker et al. | 6,163,803 A | 12/2000 | Watanabe |
| 5,948,040 A | 9/1999 | DeLorme et al. | 6,173,317 B1 | 1/2001 | Chaddha et al. |
| 5,951,636 A | 9/1999 | Zerber | 6,177,931 B1 | 1/2001 | Alexander et al. |
| 5,954,798 A | 9/1999 | Shelton et al. | 6,181,334 B1 | 1/2001 | Freeman et al. |
| 5,956,038 A | 9/1999 | Rekimoto | 6,181,711 B1 | 1/2001 | Zhang et al. |
| 5,956,716 A | 9/1999 | Kenner et al. | 6,182,072 B1 | 1/2001 | Leak et al. |
| 5,961,603 A | 10/1999 | Kunkel et al. | 6,182,116 B1 | 1/2001 | Namma et al. |
| 5,973,685 A | 10/1999 | Schaffa et al. | 6,192,340 B1 | 2/2001 | Abecassis |
| 5,978,833 A | 11/1999 | Pashley et al. | 6,192,394 B1 | 2/2001 | Gutfreund et al. |
| 5,982,436 A | 11/1999 | Balakrishnan et al. | 6,193,610 B1 | 2/2001 | Junkin |
| 5,983,069 A | 11/1999 | Cho et al. | 6,195,680 B1 | 2/2001 | Goldszmidt et al. |
| 5,987,454 A | 11/1999 | Hobbs | 6,199,014 B1 | 3/2001 | Walker et al. |
| 5,987,523 A | 11/1999 | Hind et al. | 6,199,045 B1 | 3/2001 | Giniger et al. |
| 5,999,664 A | 12/1999 | Mahoney et al. | 6,204,842 B1 | 3/2001 | Fujii |
| 5,999,929 A | 12/1999 | Goodman | 6,205,582 B1 | 3/2001 | Hoarty |
| 6,002,393 A | 12/1999 | Hite et al. | 6,233,736 B1 | 5/2001 | Wolzien |
| 6,005,561 A | 12/1999 | Hawkins et al. | 6,239,797 B1 | 5/2001 | Hills et al. |
| 6,006,252 A | 12/1999 | Wolfe | 6,240,183 B1 | 5/2001 | Marchant |
| 6,006,256 A | 12/1999 | Zdepski et al. | 6,240,555 B1 | 5/2001 | Shoff et al. |
| 6,008,802 A | 12/1999 | Iki et al. | 6,253,228 B1 | 6/2001 | Ferris et al. |
| 6,009,458 A | 12/1999 | Hawkins et al. | 6,256,785 B1 | 7/2001 | Klappert et al. |
| 6,012,083 A | 1/2000 | Savitzky et al. | 6,260,192 B1 | 7/2001 | Rosin et al. |

| | | |
|---|---|---|
| 6,266,649 B1 | 7/2001 | Linden et al. |
| 6,275,705 B1 | 8/2001 | Drane et al. |
| 6,278,942 B1 | 8/2001 | McDonough |
| 6,279,007 B1 | 8/2001 | Uppala |
| 6,285,407 B1 | 9/2001 | Yasuki et al. |
| 6,286,140 B1 | 9/2001 | Inanyi |
| 6,288,753 B1 | 9/2001 | DeNicola et al. |
| 6,289,362 B1 | 9/2001 | Van Der Meer |
| 6,292,780 B1 | 9/2001 | Doederlein et al. |
| 6,297,748 B1 | 10/2001 | Lappenbusch et al. |
| 6,298,330 B1 | 10/2001 | Gardenswartz et al. |
| 6,317,722 B1 | 11/2001 | Jacobi et al. |
| 6,317,780 B1 | 11/2001 | Cohn et al. |
| 6,317,791 B1 | 11/2001 | Cohn et al. |
| 6,326,982 B1 | 12/2001 | Wu et al. |
| 6,327,574 B1 | 12/2001 | Kramer et al. |
| 6,330,592 B1 | 12/2001 | Makuch et al. |
| 6,345,122 B1 | 2/2002 | Yamamoto et al. |
| 6,353,933 B1 | 3/2002 | Love |
| 6,366,914 B1 | 4/2002 | Stern |
| 6,373,904 B1 | 4/2002 | Sakamoto |
| 6,389,458 B2 | 5/2002 | Shuster |
| 6,397,220 B1 | 5/2002 | Deisinger et al. |
| 6,401,085 B1 * | 6/2002 | Gershman et al. ............. 707/4 |
| 6,412,011 B1 | 6/2002 | Agraharam et al. |
| 6,418,169 B1 | 7/2002 | Datari |
| 6,424,979 B1 | 7/2002 | Livingston et al. |
| 6,425,012 B1 | 7/2002 | Trovato et al. |
| 6,434,621 B1 | 8/2002 | Pezzillo et al. |
| 6,434,747 B1 | 8/2002 | Khoo et al. |
| 6,442,590 B1 | 8/2002 | Inala et al. |
| 6,442,598 B1 | 8/2002 | Wright et al. |
| 6,442,687 B1 | 8/2002 | Savage |
| 6,457,010 B1 | 9/2002 | Eldering et al. |
| 6,460,180 B1 | 10/2002 | Park et al. |
| 6,463,585 B1 | 10/2002 | Hendricks et al. |
| 6,466,929 B1 | 10/2002 | Brown et al. |
| 6,466,969 B1 | 10/2002 | Bunney et al. |
| 6,473,903 B2 | 10/2002 | Balakrishnan et al. |
| 6,480,885 B1 | 11/2002 | Olivier |
| 6,486,892 B1 | 11/2002 | Stern |
| 6,487,721 B1 | 11/2002 | Sadafi |
| 6,496,980 B1 | 12/2002 | Tillman et al. |
| RE37,957 E | 1/2003 | Garfield |
| 6,509,908 B1 | 1/2003 | Croy et al. |
| 6,513,069 B1 | 1/2003 | Abato et al. |
| 6,526,041 B1 | 2/2003 | Shaffer et al. |
| 6,526,335 B1 | 2/2003 | Treyz et al. |
| 6,549,241 B2 | 4/2003 | Hiroi |
| 6,571,234 B1 | 5/2003 | Knight et al. |
| 6,577,716 B1 | 6/2003 | Minter et al. |
| 6,578,025 B1 | 6/2003 | Pollack et al. |
| 6,580,462 B2 | 6/2003 | Inoue et al. |
| 6,591,247 B2 | 7/2003 | Stern |
| 6,597,374 B1 | 7/2003 | Baker et al. |
| 6,597,405 B1 | 7/2003 | Iggulden |
| 6,606,657 B1 | 8/2003 | Zilberstein et al. |
| 6,611,872 B1 | 8/2003 | McCanne |
| 6,615,408 B1 | 9/2003 | Kaiser et al. |
| 6,625,624 B1 | 9/2003 | Chen et al. |
| 6,625,647 B1 | 9/2003 | Barrick, Jr. et al. |
| 6,643,691 B2 | 11/2003 | Austin |
| 6,661,372 B1 | 12/2003 | Girerd et al. |
| 6,698,020 B1 | 2/2004 | Zigmond et al. |
| 6,725,159 B2 | 4/2004 | Krasner |
| 6,732,158 B1 * | 5/2004 | Hesselink et al. .......... 709/208 |
| 6,760,749 B1 | 7/2004 | Dunlap et al. |
| 6,760,916 B2 * | 7/2004 | Holtz et al. .................... 725/34 |
| 6,769,130 B1 * | 7/2004 | Getsin et al. ................. 725/89 |
| 6,792,615 B1 | 9/2004 | Rowe et al. |
| 2001/0000537 A1 | 4/2001 | Inala et al. |
| 2001/0003823 A1 | 6/2001 | Mighdoll et al. |
| 2001/0013123 A1 | 8/2001 | Freeman et al. |
| 2002/0032905 A1 | 3/2002 | Sherr et al. |
| 2002/0053078 A1 | 5/2002 | Holtz et al. |
| 2002/0056091 A1 | 5/2002 | Bala et al. |
| 2002/0056129 A1 | 5/2002 | Blackketter et al. |
| 2002/0112002 A1 | 8/2002 | Abato |
| 2002/0156909 A1 | 10/2002 | Harrington |
| 2002/0188943 A1 | 12/2002 | Freeman et al. |
| 2002/0194589 A1 | 12/2002 | Sheehan et al. |

FOREIGN PATENT DOCUMENTS

| | | |
|---|---|---|
| AU | 774028 | 6/2004 |
| CA | 246437 | 1/1925 |
| CA | 2345161 | 6/1994 |
| CA | 2345161 A1 | 6/1994 |
| CA | 2245841 | 8/1994 |
| CA | 2186027 | 9/1995 |
| CA | 2186027 C | 9/1995 |
| CA | 2220483 | 11/1996 |
| DE | 44 27 046 A1 | 2/1996 |
| DE | 44 31 438 A1 | 3/1996 |
| DE | 19545882 | 6/1997 |
| EP | 0 016 314 A1 | 10/1980 |
| EP | 0 128 481 | 12/1984 |
| EP | 0 128 481 A2 | 12/1984 |
| EP | 0 163 577 | 12/1985 |
| EP | 0 163 577 A2 | 12/1985 |
| EP | 0 314 572 | 5/1989 |
| EP | 0 314 572 A2 | 5/1989 |
| EP | 0424648 | 5/1991 |
| EP | 0 489 387 | 12/1991 |
| EP | 0 489 387 A2 | 12/1991 |
| EP | 0 562 221 A1 | 9/1993 |
| EP | 0 632 659 A | 1/1995 |
| EP | 0 632 659 A2 | 1/1995 |
| EP | 0 673 164 | 3/1995 |
| EP | 0 673 164 A1 | 3/1995 |
| EP | 0 707 426 A | 4/1996 |
| EP | 0 707 426 A2 | 4/1996 |
| EP | 0 757 485 | 2/1997 |
| EP | 0 757 485 A2 | 2/1997 |
| EP | 0 805 598 | 11/1997 |
| EP | 0 805 598 A1 | 11/1997 |
| EP | 0 837 609 | 4/1998 |
| EP | 0 837 609 A2 | 4/1998 |
| EP | 0 847 200 | 6/1998 |
| EP | 0 847 200 A1 | 6/1998 |
| EP | 0852443 A | 7/1998 |
| EP | 0 871 337 | 10/1998 |
| EP | 0 871 337 A2 | 10/1998 |
| EP | 0 879 536 B1 | 11/1998 |
| EP | 0 879 536 B1 | 11/1998 |
| EP | 0901284 A | 3/1999 |
| EP | 0 952 539 | 10/1999 |
| EP | 0 952 539 A2 | 10/1999 |
| EP | 0 982 943 | 5/2000 |
| EP | 0 982 943 A2 | 5/2000 |
| EP | 1 021 037 A2 | 7/2000 |
| EP | 1 021 037 A2 | 7/2000 |
| EP | 1 061 739 A2 | 12/2000 |
| EP | 1 061 739 A2 | 12/2000 |
| EP | 1 089 201 | 4/2001 |
| EP | 1 089 201 A1 | 4/2001 |
| EP | 1111914 A | 6/2001 |
| GB | 2 132 856 | 7/1984 |
| GB | 2 132 856 A | 7/1984 |
| GB | 2 325 537 | 11/1998 |
| GB | 2 325 537 A | 11/1998 |
| GB | 2 327 837 | 2/1999 |
| GB | 2 327 837 A | 2/1999 |
| GB | 2290431 | 12/1999 |
| GB | 2290431 A | 12/1999 |
| GB | 2 347 055 | 8/2000 |

| | | |
|---|---|---|
| GB | 2 347 055 A | 8/2000 |
| GB | 2 350 213 | 11/2000 |
| GB | 2 350 213 A | 11/2000 |
| GB | 2353430 | 2/2001 |
| GB | 2353430 A | 2/2001 |
| GB | 2356319 A | 5/2001 |
| GB | 2 359 708 | 8/2001 |
| GB | 2 359 708 A | 8/2001 |
| GB | 2 349 289 | 9/2001 |
| GB | 2 359 958 | 9/2001 |
| GB | 2 359 958 A | 9/2001 |
| GB | 2 356 516 | 4/2002 |
| GB | 2 356 518 | 4/2002 |
| GB | 2 356 517 | 11/2002 |
| JP | 4-127688 | 4/1992 |
| JP | 4207885 | 7/1992 |
| JP | 5-64167 | 3/1993 |
| JP | 5176306 | 7/1993 |
| JP | 6165170 | 6/1994 |
| JP | 060303543 | 10/1994 |
| JP | 7-46198 | 2/1995 |
| JP | 7-288606 | 10/1995 |
| JP | 7-307813 | 11/1995 |
| JP | 8-8860 | 1/1996 |
| JP | 10-222541 | 11/1998 |
| KR | 1997-0009356 | 2/1997 |
| WO | WO 81/02961 | 10/1981 |
| WO | WO-90-00847 | 1/1990 |
| WO | WO 93/06675 | 4/1993 |
| WO | WO 93/06675 A1 | 4/1993 |
| WO | WO 93/07713 | 4/1993 |
| WO | WO 93/07713 A1 | 4/1993 |
| WO | WO 93/11617 | 6/1993 |
| WO | WO 93/11617 A1 | 6/1993 |
| WO | WO 93/22877 | 11/1993 |
| WO | WO 93/22877 A2 | 11/1993 |
| WO | WO 94/03851 | 2/1994 |
| WO | WO 94/03851 A1 | 2/1994 |
| WO | WO 94/13107 | 6/1994 |
| WO | WO 94/13107 A1 | 6/1994 |
| WO | WO 96/05699 | 2/1996 |
| WO | WO 96/07270 | 3/1996 |
| WO | WO 96/07270 A1 | 3/1996 |
| WO | WO 96/08923 | 3/1996 |
| WO | WO 96/08923 A1 | 3/1996 |
| WO | WO 96/13124 | 5/1996 |
| WO | WO 96/13124 A1 | 5/1996 |
| WO | WO 96/17492 | 6/1996 |
| WO | WO 96/17492 A2 | 6/1996 |
| WO | WO 96/37075 | 11/1996 |
| WO | WO 96/37075 A1 | 11/1996 |
| WO | WO 97/02689 | 1/1997 |
| WO | WO 97/02689 A1 | 1/1997 |
| WO | WO 97/02699 | 1/1997 |
| WO | WO 97/02699 A1 | 1/1997 |
| WO | WO 97/22207 | 6/1997 |
| WO | WO 97/22207 A1 | 6/1997 |
| WO | WO 97/27546 | 7/1997 |
| WO | WO 97/27546 A1 | 7/1997 |
| WO | WO 97/29458 | 8/1997 |
| WO | WO 97/29458 A1 | 8/1997 |
| WO | WO 97/29591 | 8/1997 |
| WO | WO 97/29591 A1 | 8/1997 |
| WO | WO 97/33434 | 9/1997 |
| WO | WO 97/33434 A1 | 9/1997 |
| WO | WO 97/45965 | 12/1997 |
| WO | WO 97/45965 A1 | 12/1997 |
| WO | WO 98/08340 | 2/1998 |
| WO | WO 98/08340 A1 | 2/1998 |
| WO | WO 98/23080 | 5/1998 |
| WO | WO 98/23080 A2 | 5/1998 |
| WO | WO 98/29956 | 7/1998 |
| WO | WO 98/29956 A2 | 7/1998 |
| WO | WO 98/32281 | 7/1998 |
| WO | WO 98/32281 A1 | 7/1998 |
| WO | WO 98/32284 | 7/1998 |
| WO | WO 98/32284 A1 | 7/1998 |
| WO | WO 98/44737 | 10/1998 |
| WO | WO 98/44737 A1 | 10/1998 |
| WO | WO-98-45902 | 10/1998 |
| WO | WO-98-48566 A1 | 10/1998 |
| WO | WO 98/54902 | 12/1998 |
| WO | WO 98/54902 A1 | 12/1998 |
| WO | WO 99/09741 | 2/1999 |
| WO | WO 99/09741 A1 | 2/1999 |
| WO | WO 99/26415 | 5/1999 |
| WO | WO 99/26415 A1 | 5/1999 |
| WO | WO 99/27713 | 6/1999 |
| WO | WO 99/27713 A1 | 6/1999 |
| WO | WO 99/39506 | 8/1999 |
| WO | WO 99/39506 A1 | 8/1999 |
| WO | WO 99/44159 | 9/1999 |
| WO | WO 99/44159 A1 | 9/1999 |
| WO | WO 99/45726 | 9/1999 |
| WO | WO 99/45726 A1 | 9/1999 |
| WO | WO 99/50778 | 10/1999 |
| WO | WO 99/50778 A1 | 10/1999 |
| WO | WO-99-55066 A1 | 10/1999 |
| WO | WO 00/14987 | 3/2000 |
| WO | WO 00/14987 A1 | 3/2000 |
| WO | WO 00/16544 | 3/2000 |
| WO | WO 00/16544 A2 | 3/2000 |
| WO | WO 00/36836 | 6/2000 |
| WO | WO 00/36836 A1 | 6/2000 |
| WO | WO 00/36886 | 6/2000 |
| WO | WO 00/43853 | 7/2000 |
| WO | WO 00/43853 A2 | 7/2000 |
| WO | WO 00/43892 | 7/2000 |
| WO | WO 00/43892 A1 | 7/2000 |
| WO | WO 00/43899 | 7/2000 |
| WO | WO 00/43899 A1 | 7/2000 |
| WO | WO-00-045599 A | 8/2000 |
| WO | WO 00/51310 | 8/2000 |
| WO | WO 00/51310 A1 | 8/2000 |
| WO | WO 00/77664 | 12/2000 |
| WO | WO 00/77664 A2 | 12/2000 |
| WO | WO-01-015357 A | 3/2001 |
| WO | WO 01/24027 | 4/2001 |
| WO | WO 01/24027 A1 | 4/2001 |
| WO | WO-01-58132 A1 | 8/2001 |
| WO | WO 02/31627 | 4/2002 |
| WO | WO 02/31627 A2 | 4/2002 |
| WO | WO 02/065252 | 8/2002 |
| WO | WO 02/065252 A2 | 8/2002 |
| WO | WO 02/065318 | 8/2002 |
| WO | WO 02/065318 A2 | 8/2002 |

OTHER PUBLICATIONS

"Real System G2 Production Guide," 1998-2000; pp. 75-79.
Wittig et al., "Intelligent Media Agents In Interactive Television Systems," Proceedings of the International Conference on Multimedia Computing and Systems, Los Alamitos, CA, May 15, 1995, pp. 182-189, XP000603484.
Yu P.S. et al., "Design And Analysis Of Look Ahead Scheduling Scheme To Support Pause-Resume For Video-On-Demand Applications," Multimedia Systems, vol. 3, No. 4, Jan. 1995, pp. 137-149, XP000576898.
Willebeek-Lemair et al., "On Multi-point Video Control Units for Videoconferencing", 1994, pp. 356-364, IBM T.J. Watson Research Center.
Sandra Beudin: *"The Web is not TV, or is it?" DZINE, 'Online! Dec. 31, 1996, XP002257234, Retrieved from the Internet*: URL:www.exn.ca/stories/1999/03/01/04.asp> retrieved on Oct. 9, 2003.

*EarthWeb and ACTV Unveil Hyper TV*, http://www.3dsite.com/3dsite/cgi/publications/daily-spectrum/issue206.html: date unknown.

Bryan Proffit, "Intercast Brings Web to TV," Jan. 21, 1997, PC Magazine, pp. 203-204.

Funkschau, DE, Franzis-Verlag, K.G. Munchen; Verknuepfung Von TV MIT Internet, (Combining TV with the Internet), vol. 16, No. 18; Aug. 16, 1996, pp. 70-71, middle column, p. 71, paragraph 2. (English translation attached).

Tsuruta et al., "A Knowledge Based Interactive Train Scheduling System Aiming At Large Scale Complex Planning Expert Systems," International Workshop on Artificial Intelligence for Industrial Applications, 1988, pp. 490-495.

Harless et al., "Interactive Video Disc Case Studies for Medical Education," 10th Annual Symposium on Computer Applications in Medical Care, Oct. 25-26, 1986, pp. 183-187.

Bock, "Videodisk Standards: A Software View of the Technology," SMPTE Journal, vol. 92. No. 5, May 1983, pp. 571-576.

Campbell. "Optimal Decision Making in a Business Simulation," System Sciences, 1989 Annual Hawaii International Conference, vol. III, pp. 822-831.

F. Dawson, "Compression of the Fast Track," Cablevision, Apr. 22, 1991, pp. 22-30.

Y. Gault, "Turning Cold Box Into Interactive TV," Crain's New York Business, Jul. 15, 1991, p. 17.

G. Gilder, "Now or Never, Forbes," Oct. 14, 1991, pp. 188-189.

G. Kim, "First All-Digital HDTV Developed by Video Cipher," Multichannel News, Jun. 11, 1990, p. 35.

G. Kim, "ATC: Technical Tidal Wave to Engulf Cable Industry," Multichannel News, Aug. 13, 1990, p. 33-34.

G. Kim, "Jerold Offers Cable Digital Compression," Multichannel News, Mar. 11, 1991, p. 6.

G. Kim, "Test Equipment for Digital Still a Puzzle," Multichannel News, May 27, 1991, p. 24.

Martial et al., "An Interactive Planner for Open Systems," Proceedings of the 4th Conference on Artificial Intelligence, Mar. 1988, pp. 293-298.

R. Powell; "Digitizing TV Into Obsolescence," New York Times, Oct. 20, 1991.

H.F. Waters et al., "Talking Back to the Tube," Newsweek, Dec. 3, 1990, pp. 56-57.

"Will it Revolutionize HDTV?," Broadcasting, Jun. 4, 1990, pp. 33-34.

"Video Storage in Digital Transmission," Space Technology, Cable Television Laboratories, vol. 3, No. 7, 1991, p. 1-6.

Dale Cripps. "Web TV over Digital Cable", May 4, 1998, http://web-star.com/hdtvnews/webtvoverdigitalcable.html: pp. 1-4.

Dale Cripps, "Internet TV Advertising", May 8, 1998, http://web-star.com/hdtvnews/internettgadvertising.html; pp. 1-3.

Dale Cripps, "Gates, TV, Interactivity," May 5, 1998, http://web-star.com/hdtvnews/gatestvinteractivity.html; pp. 1-4.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

"Funkschau Fachzeitschrift für elektronische Kommunikation", vol. 6/96 of Mar. 1, 1996., pp. 70-75. and English Translation of extract from Funkschau Fachzeitschrift für elektronische Kommunikation.

"*Different takes on Wedding TV to Web,*" *NEWSBYTES, 'Online! Mar. 1, 1999, XP002257234 Retrieved from the Internet*: <URL:www.exn.ca/Stories/1999/03/01/04.asp>'retrieved on Oct. 9, 2003! p. 1, last paragraph.

Kieron Murphy: "HyperTV fuses Java with television" JAVAWORLD, 'Online! May 1996, XP00257236 Retrieved from the Internet: <URL:www.javaworld.com/javaworld/jw-05-1996/jw-05-hypertv.html> 'retrieved on Oct. 9, 2003.

Korean Office Action mailed May 1, 2004 issued in counterpart application with English translation of Examiner's Grounds for Rejection.

Susie J.Wee et al., "Slicing MPEG Video Streams in the Compressed Domain", IEEE, 1997, pp. 225-230.

Norm Hurst et al., "MPEG Splicing: A New Standard for Television—SMPTE 312M," Nov. 1998, pp. 978-988.

"Joining Television and the Internet Using Java", Internet Week, pp. 1-2, Apr. 1, 1996.

Dybvik et al., "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.

Tak K. Woo et al., "A Synchronous Collaboration Tool for the World-Wide Web," Second International WWW Conference '94, Mosaic and the Web, Advance Proceedings, vol. 1, Oct. 17-20, 1994, at 315.

Intercast Industry Group, Press Release, "Leaders in PC, Broadcast and Cable Industries Announce Formation of Industry Group to Promote New Digital Medium for the Home PC," Business Wire, Oct. 23, 1995.

"Frequently Asked Questions," The Intercast Industry Group, Fall 1996, pp. 1-7.

Vinay Kumar et al., "A Shared Web to Support Design Teams," Third Workshop on Enabling Technologies: Infrastructure for Collaborative Enterprises, Morgantown, West Virginia, Apr. 17-19, 1994 at 178.

Nikkei Bp Corp., "Intercast Using Gap Television Signal," Nikkei Electronics, Japan, Dec. 18, 1995, No. 651, p. 106.

Television Society, "Interactive Television Broadcast Using Character Broadcast System, Video Information and Broadcast Technology," Nov. 20, 1995, vol. 11, p. 1482-1487.

Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.

Mannos, T.J., "Re: Web page prefetching?" located at <URL:http://dejanews.com> retrieved on Oct. 4, 2002, DEJA News (Online), Dec. 1, 1997.

Philippe Le Hegaret, "Document Object Module (DOM)," Architecture Domain retrieved from www.w3.org/DOM/ on Jun. 22, 2001, 2 pages.

S. Gillich et al., "ATVEF Integration with DVB Using IP/MPE," Dec. 20, 1999, retrieved from www.atvef.com/library/atvef-dub-bindingR8.html retrieved on Jun. 8, 2001, 5 pages.

J. Steinhorn et al., "Embedded Systems Programming-Enhancing TV with ATVEF," retrieved from www.embedded.com/1999/9910/9910ial.htm on Mar. 28, 2000, 10 pages.

"Enhanced Content Specification," ATVEF, 1998, retrieved from www.atvef.com/library/spec1-la.html on Mar. 28, 2000, 38 pages.

"Advanced Television Enhancement Forum Specification (ATVEF)," Comment Draft Version 1.0rl, Feb. 25, 1999, XP002142688.

Advanced Television Systems Committee, "ATSC Digital Television Standard Revision A," Apr. 6, 2001, pp. 1-65.

Advanced Television Systems Committee, "ATSC, Summary of Standards and Activities," Nov. 21, 2000, pp. 1-3.

Advanced Television Systems Committee, "ATSC Data Broadcast Standard," Jul. 26, 2000, pp. 1-88.

Eitz, "Combiners for Videotext Signals," Broadcast Technology Reports, translation of vol. 28, No. 6, Nov. 1984, pp. 273-289, XP002182048, Norderstedt, Germany.

EarthWeb and ACTV Unveil Hyper TV, http://www.3dsite.com/3dsite/cqi/publications/daily-spectrum/issue206.html; date unknown.

Bryan Proffit, "Intercast Brings Web to TV," Jan. 21, 1997, PC Magazine, pp. 203-204.

Funkschau, DE, Franzis-Verlag, K.G. Munchen; Verknuepfung Von TV MIT Internet, (Combining TV with the Internet), vol. 16, No. 18; Aug. 16, 1996, pp. 70-71, middle column, p. 71, paragraph 2, (English translation attached).

Tsuruta et al., "A Knowledge Based Interactive Train Scheduling System Aiming At Large Scale Complex Planning Expert Systems," International Workshop on Artificial Intelligence for Industrial Applications, 1988, pp. 490-495.

Harless et al., "Interactive Video Disc Case Studies for Medical Education," 10th Annual Symposium on Computer Applications in Medical Care, Oct. 25-26, 1986, pp. 183-187.

Bock, "Videodisk Standards: A Software View of the Technology," SMPTE Journal, vol. 92. No. 5, May 1983, pp. 571-576.

Campbell. "Optimal Decision Making in a Business Simulation," System Sciences, 1989 Annual Hawaii International Conference, vol. III, pp. 822-831.

F. Dawson, "Compression of the Fast Track," Cablevision, Apr. 22, 1991, pp. 22-30.

Y. Gault, "Turning Cold Box Into Interactive TV," Crain's New York Business, Jul. 15, 1991, p. 17.

G. Gilder, "Now or Never," Forbes," Oct. 14, 1991, pp. 188-189.

G. Kim, "First All-Digital HDTV Developed by Video Cipher," Multichannel News, Jun. 11, 1990. p. 35.

G. Kim, "ATC: Technical Tidal Wave to Engulf Cable Industry," Multichannel News, Aug. 13, 1990, p. 33-34.

G. Kim, "Jerold Offers Cable Digital Compression," Multichannel News, Mar. 11, 1991, p. 6.

G. Kim, "Test Equipment for Digital Still a Puzzle," Multichannel News, May 27, 1991, p. 24.

Martial et al., "An Interactive Planner for Open Systems," Proceedings of the 4th Conference on Artificial Intelligence, Mar. 1988, pp. 293-298.

R. Powell; "Digitizing TV Into Obsolescence," New York Times, Oct. 20, 1991.

H.F. Waters et al., "Talking Back to the Tube," Newsweek, Dec. 3, 1990, pp. 56-57.

"Will it Revolutionize HDTV?," Broadcasting, Jun. 4, 1990, pp. 33-34.

"Video Storage in Digital Transmission," Space Technology, Cable Television Laboratories, vol. 3, No. 7, 1991, p. 1-6.

Dale Cripps, "Web TV over Digital Cable", May 4, 1998, http://web-star.com/hdtvnews/webtvoverdigitalcable.html; pp. 1-4.

Dale Cripps, "Internet TV Advertising", May 8, 1998, http://web-star.com/hdtvnews/internettgadvertising.html; pp. 1-3.

Dale Cripps, "Gates, TV, Interactivity," May 5, 1998, http://web-star.com/hdtvnews/gatestvinteractivity.html; pp. 1-4.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

"Funkschau Fachzeitschrift für elektronische Kommunikation", vol. 6/96 of Mar. 1, 1996., pp. 70-75. and English Translation of extract from funkschau Fachzeitschrift für elektronische Kommunikation. "Different takes on Wedding TV to Web," NEWSBYTES, 'Online! Mar. 1, 1999, XP002257234 Retrieved from the Internet: <URL:www.exn.ca/Stories/1999/03/01/04.asp> retrieved on Oct. 9, 2003!p. 1, last paragraph.

Kieron Murphy: "HyperTV fuses Java with television" JAVAWORLD, 'Online! May 1996, XP00257236 Retrieved from the Internet: <URL:www.javaworld.com/javaworld/jw-05-1996/jw-05-hypertv.html> retrieved on Oct. 9, 2003.

Korean Office Action mailed May 1, 2004 issued in counterpart application with English translation of Examiner's Grounds for Rejection.

Susie J.Wee et al., "Slicing MPEG Video Streams in the Compressed Domain", IEEE, 1997, pp. 225-230.

Norm Hurst et al., "MPEG Splicing: A New Standard for Television—SMPTE 312M" Nov. 1998, pp. 978-988.

"Joining Television and the Internet Using Java", Internet Week, pp. 1-2, Apr. 1, 1996.

Dybvik et al., "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.

Tak K. Woo et al., "A Synchronous Collaboration Tool for the World-Wide Web," Second International WWW Conference '94, Mosaic and the Web, Advance Proceedings, vol. 1, Oct. 17-20, 1994, at 315.

Intercast Industry Group, Press Release, "Leaders in PC, Broadcast and Cable Industries Announce Formation of Industry Group to Promote New Digital Medium for the Home PC," Business Wire, Oct. 23, 1995.

"Frequently Asked Questions," The Intercast Industry Group, Fall 1996, pp. 1-7.

Vinay Kumar et al., "A Shared Web to Support Design Teams," Third Workshop on Enabling Technologies: Infrastructure for Collaborative Enterprises, Morgantown, West Virginia, Apr. 17-19, 1994 at 178.

Nikkei Bp Corp., "Intercast Using Gap Television Signal," Nikkei Electronics, Japan, Dec. 18, 1995, No. 651, p. 106.

Television Society, "Interactive Television Broadcast Using Character Broadcast System, Video Information and Broadcast Technology," Nov. 20, 1995, vol. 11, p. 1482-1487.

Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.

Mannos, T.J., "Re: Web page prefetching?" located at <URL:http://dejanews.com> retrieved on Oct. 4, 2002, DEJA News (Online), Dec. 1, 1997.

Philippe Le Hegaret, "Document Object Module (DOM)," Architecture Domain retrieved from www.w3.org/DOM/ on Jun. 22, 2001, 2 pages.

S. Gillich et al., "ATVEF Integration with DVB Using IP/MPE," Dec. 20, 1999, retrieved from www.atvef.com/library/atvef-dub-bindingR8.html retrieved on Jun. 8, 2001, 5 pages.

J. Steinhorn et al., "Embedded Systems Programming-Enhancing TV with ATVEF," retrieved from www.embedded.com/1999/9910/9910ial.htm on Mar. 28, 2000, 10 pages.

"Enhanced Content Specification," ATVEF, 1998, retrieved from www.atvef.com/library/spec1-la.html on Mar. 28, 2000, 38 pages.

"Advanced Television Enhancement Forum Specification (ATVEF)," Comment Draft Version 1.Orl, Feb. 25, 1999, XP002142688.

Advanced Television Systems Committee, "ATSC Digital Television Standard Revision A," Apr. 6, 2001, pp. 1-65.

Advanced Television Systems Committee, "ATSC, Summary of Standards and Activities," Nov. 21, 2000, pp. 1-3.

Advanced Television Systems Committee, "ATSC Data Broadcast Standard," Jul. 26, 2000, pp. 1-88.

Eitz, "Combiners for Videotext Signals," Broadcast Technology Reports, translation of vol. 28, No. 6, No. 1984, pp. 273-289, XP002182048, Norderstedt, Germany.

Almerot Quinn "ip Multicast Applications: Challenges and Solutions," IETF Draft retrieved from the Internet: URL:http://www.cs.ucsb.edu/~almeroth/classes/S00.276/papers/McastApps.txt retrieved on Mar. 3, 2005.

Zabele Braudes "Requirements for Multicast Protocols," IETF RFC, retrieved from the Internet: URL:www.ietf.org/rfc/rfc1458.txt.

ATNEWYORKSTAFF: "ACTV Reinvents Internet Television Service," retrieved from the Internet: URL:http://www.atnewyork.com/news/article.php/249871 retrieved on Oct. 17, 2003.

* cited by examiner

SYSTEM AND METHOD FOR PROVIDING TARGETED PROGRAMMING OUTSIDE OF THE HOME

FIELD OF THE INVENTION

This invention relates generally to providing programming content to users outside of their homes. This invention further relates to the automated selection of programming content based upon profiles of individual users or classes of users.

BACKGROUND OF THE INVENTION

Targeted programming typically consists of providing programming to an individual user or group of users based upon profile information that has been collected about the individual user and/or group of users. For purposes of efficiency, "users" and "groups of users" are hereinafter collectively referred to as users, and the term "users" shall imply both the singular and/or plural context, as appropriate. Further, the terms "program" and "programming" are defined for the purposes of this application to include, but not be limited to, any type of content and/or information that may be communicated to a user, for example, advertising, entertainment, educational programming, informative programming, television programming, radio programming, news programming, motion picture programming, video game programming, video programming, audio programming, live programming, pre-recorded programming, sports programming, music programming, music video programming, game show programming, non-commercial programming and other formats. Additionally, advertising and programming are used herein throughout and such terms are to be construed as being synonymous for purposes of the present invention and relate to providing content to users.

User profile information may, for example, include geographic information, age, income level, profession, hobbies, and important dates to the user, such as birth dates and anniversaries, purchase histories, and other information. The user profile information can help a programmer direct a particular type of programming to users that may have a higher likelihood of responding to that particular type of programming. Advertisers, for example, often collect user profile information from various mailing lists to target direct mailing advertising campaigns to users in their homes.

Advertisers, however, generally do not have the same type of access to user profile information while providing advertising to users outside of their homes. Thus, advertising directed to users while they are outside of their home is generally not targeted to a single user, but is typically presented generically or randomly to all users who are present at that time and location. Thus, a system and a method are needed that provide access to user profile information which may be utilized to provide targeted programming to users at locations outside of a user's home.

SUMMARY OF THE INVENTION

This invention provides a system and a method for providing targeted programming to users while they are outside of their homes. In a preferred embodiment, such targeted programming can be provided at fixed locations, however, wireless and other mobile embodiments may also be utilized with the present invention. The system and method of the present invention utilize profile information for users to select programming for presentation to particular users. As mentioned previously, the programming content may, for example, include advertising, entertainment or a mixture of the two.

In one embodiment, the present invention includes a system for presenting targeted programming to a user outside of the user's home. The system includes a presentation device and a hub. The presentation device receives a user identification and/or user profile information and provides the identification and/or user profile information to the hub. If user profile information is not already provided by the presentation device, the hub then obtains a user profile associated with the user identification. The hub selects programming based, at least in part, on the received user profile (or another profile, for example, one based upon a geographic location), which the presentation device then presents to the user.

In an alternative embodiment, a system for presenting targeted programming to a user outside of the user's home includes a user identification device, a controller and a presentation device. The user identification device receives a user identification. The controller obtains a user profile associated with the user identification and selects programming to present to the user based, at least in part, on the user profile. The presentation device presents the programming to the user.

The present invention also includes a method for providing targeted programming to a user. This method includes receiving a user identification associated with a user; retrieving a user profile associated with the user identification; selecting programming based at least in part on the user profile; and presenting the programming to the user outside of the user's home.

BRIEF DESCRIPTION OF THE DRAWINGS

The preferred and alternative embodiments of the invention will be described in detail with reference to the following figures, wherein like numerals refer to like elements, and wherein.

DETAILED DESCRIPTION OF THE INVENTION

Figure 1:
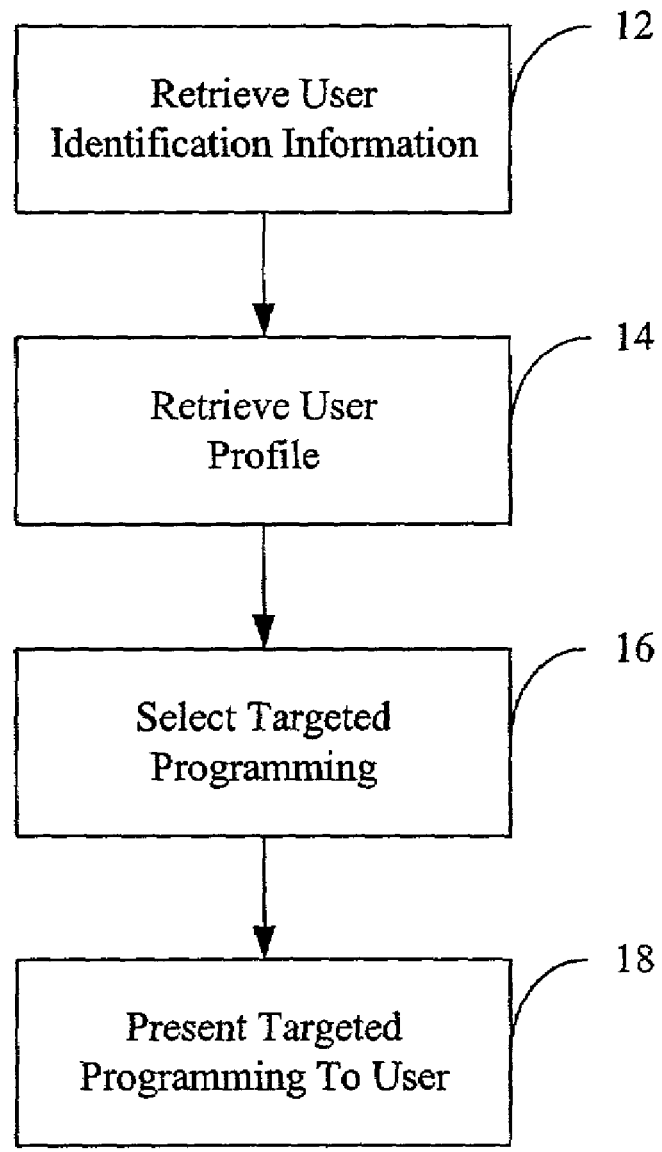
FIG. 1 is a process flow chart of one embodiment of a targeted programming method of the present invention.

FIG. 1 shows a preferred embodiment of a method for providing targeted programming. As discussed previously, programming content includes, but is not limited to, any type of content and/or information that may be communicated to a user, for example, advertising, entertainment, educational programming, informative programming, television programming, radio programming, news programming, motion picture programming, video game programming, video programming, audio programming, live programming, prerecorded programming, sports programming, music programming, music video programming, game show programming, non-commercial programming and other forms of programming. When a user is present at a reception site outside of his or her home, the system obtains user identification information as shown in step 12. The user identification information may be obtained from the user directly or indirectly and may include, for example, a credit card number, personal identification number ("PIN"), account number, name, birth date, phone number, zip code, city, county, state, country, region, social security number, driver's license number, license plate number, vehicle identification number, or other code that identifies the user either individually or as a member of a group. Alternatively, information may be obtained from the reception site to identify a particular action of a user that may be used to select programming targeted to that user. For example, if the user is purchasing one item, the system may present advertising for another item that is complementary to the item being purchased.

After the user identification information has been obtained, user profile information is obtained in step 14. The user profile is preferably based upon the user identification information obtained in step 12. The user profile may, for example, be retrieved from a database that includes information about the user that may be useful in selecting programming to present to that user. A user profile, for example, may include information such as geographic information, demographic information, addresses, profession, income level, age, sex, race, religion, nationality, economic status, birth dates of a user, friends and family members, other important dates such as anniversaries and other events, the year, make and model of a user's vehicle(s), service records of a user's vehicle(s), a history of purchases made by a user, and other information. It is to be appreciated that any information may be captured related to and/or provided by a user that can be utilized to create a user profile. The present invention is not linked to specific types or elements of information and may utilize any information in determining which programs, if any, to target its users.

Next, the user profile information retrieved from the database is used to select programming that is targeted to the user in step 16. For example, when the user profile information includes service records for the user's vehicle, such information may be utilized to determine that the user's vehicle is due for a manufacturer's recommended service, and to select advertising for a special on that particular service or related service. In a preferred embodiment the determinations are preferably accomplished by the database or related system that processes user profile information. However, the system of the present invention (as discussed below) may also be configured to perform such processing, as desired.

The selected programming is then presented to the user in step 18. The programming, for example, may include video, audio, still frame pictures, graphics, textual information, animations, multimedia, slow frame video data, video stills, sequences of individual frames, virtual reality data, live data, pre-recorded data and/or computer generated data. The programming may, for example, include MPEG programming files or other files formatted in similar industry standard video and audio compression schemes. The programming may also be presented to the user via various mediums, such as by printing a coupon on a printer, playing an audio message over a speaker and/or showing video, graphic or text programming on a display screen.

Figure 2:
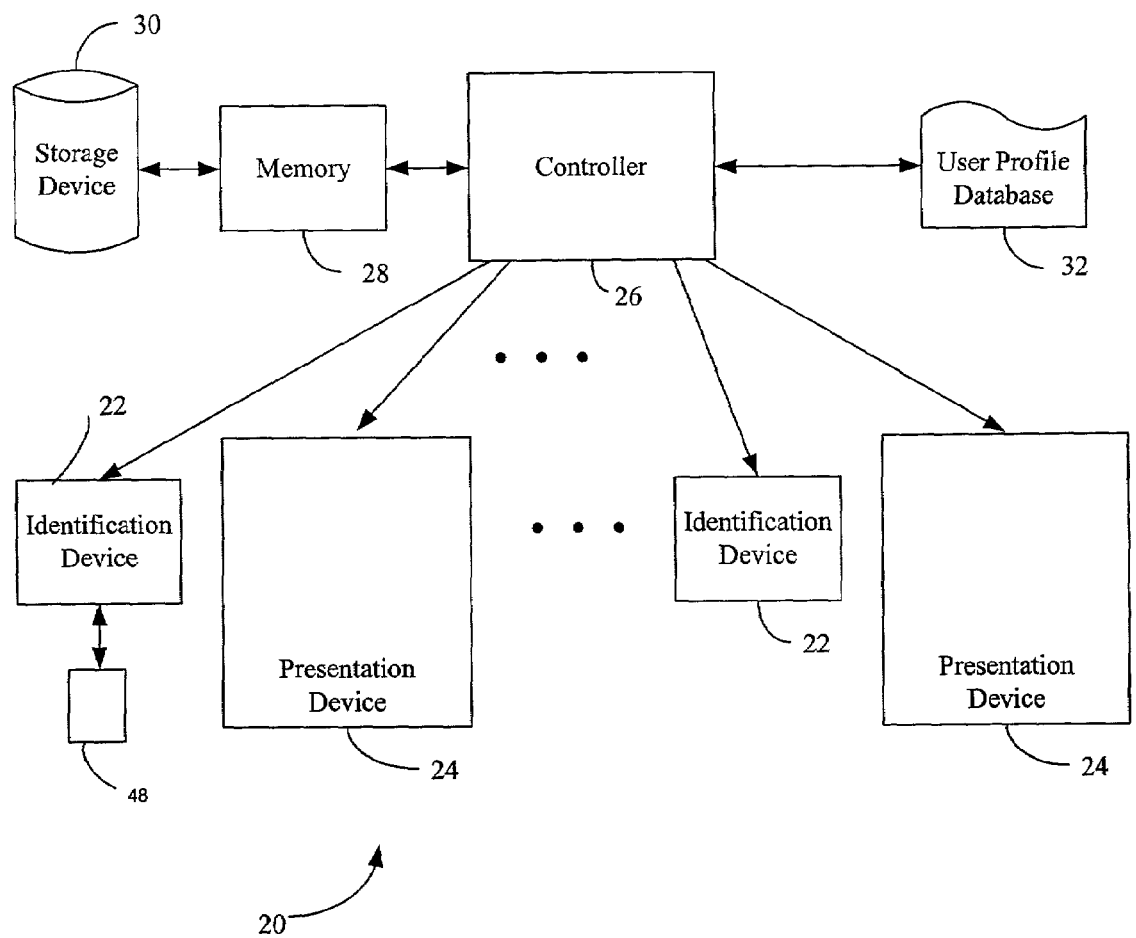
FIG. 2 is a block diagram of one embodiment of a targeted programming system of the present invention.

FIG. 2 shows a block diagram of one embodiment of a targeted programming system 20 of the present invention. The targeted programming system 20 preferably includes a user interface device 22, a presentation device 24, a controller 26, a memory 28, a storage device 30 and a user profile database 32. While this figure shows database 32 as part of the system 20, the system 20 may alternatively include a connection to a database that is external to the system 20, such as over a communications network. When a user is present at a presentation device 24, such as at a gas pump or an Automated Teller Machine ("ATM"), the user interface device 22 obtains user interface information. The user interface device 22 may, for example, obtain the user identification information from the user by means of a user identification device 48. The identification device 48, for example, may be a wireless transmitting device such as a passive transponder, a radio frequency or infrared device.

One such wireless transmitting device that may be used with the present invention is a passive integrated transponder device such as described in U.S. Pat. No. 4,730,188 entitled "Identification System" issued to Thomas A. Milheiser. It should be apparent, however, that this is just one of many possible wireless transmitting devices that may be used with the present invention to provide user identification information.

The user interface device 22, alternatively, may capture user identification information from a user identification device 48 such as a credit card number or other account number used in a transaction., For example, when a user purchases gas at a pump with a credit card or uses a debit card at an ATM, the user interface device 22 may capture the card number and/or PIN that were used in the transaction in order to identify the user. In another embodiment, the user interface device 22 may include a magnetic card reader such as the type used to read credit card information, a smart card reader, an optical reader, an optical scanner, a barcode scanner, a video camera that captures a license plate number, vehicle identification number ("VIN") or other portion of the user's vehicle, a device keyboard, a keypad, a touch screen, a voice activated control interface, or even a system that can identify the user based upon certain physiological traits such as a fingerprint, voice recognition, retina configuration and other biometrics. Further, the user interface device 22 may be configured to determine a user's identification automatically or upon user input.

The identification information is transferred from the user interface device 22 to the controller 26. The controller 26 uses the identification information to obtain a user profile from the user profile database 32, or, alternatively, from a remote location external to the system, such as over a network. For example, the controller may obtain a user profile over an intranet, an extranet, a local area network ("LAN"), a wide area network ("WAN"), or over the Internet. The controller then selects programming based, at least in part, upon information provided by the user profile. The programming may include, but is not limited to, video, audio, still frame pictures, graphics, and/or textual information. The controller 26 may obtain the desired programming from the storage device 30, the memory 28, from other remote locations, and/or may generate the desired programming in real time.

The controller 26 then transfers the selected programming to the presentation device 24 for presentation to the user. The presentation device 24 may be, for example, a printer, a television including high definition television ("HDTV") or other video screen where the screen may comprise, for example, a tube, plasma, liquid crystal and other display systems, home theater system, a computer workstation, a laptop computer, a personal computer, a speaker, an audio system, a radio or other audio playback device such as an MP3 player, a video game console, a gaming console, a set-top box, a telephony device, a telephony answering device, a wireless device such as a wireless telephony device, an Internet-enabled telephone, a web phone, a pager, a web pad, a web tablet, a personal digital assistant ("PDA"), a virtual reality system, a heads-up display, a tactile or sensory perceptible signal generator and any other device capable of presenting a programming signal to a user. The presentation device preferably includes input and output components necessary to receive and to present programming to a user.

The presentation device 24 may be a stand-alone unit that provides the targeted programming directly to the user. Similarly, the presentation device 24 may be included in, utilized by, or hosted by another device, such as a display screen on a gas pump, or an ATM, which functions as both a presentation device of the targeted programming of the present invention as well as performs its regular functions. The presentation device 24 may include hardware and software components that allow users to connect their own user devices to the presentation device 24. The presentation device 24 may include, for example, a modem, serial or parallel port, radio frequency port, infrared port, or other communication device that allows a user to receive the programming directly into his or her own device such as a PDA, video game console, audio playback device (e.g., MP3 player), radio (such as a car radio having built-in memory), a global positioning system ("GPS"), laptop computer or other device. When a data storage medium is included with such device, the programming may be stored and then viewed or listened to immediately or at a later time or date.

The presentation device 24 may be located at a fixed location outside of a user's home such as at a gas pump or an ATM, or may be mobile, such as a vehicle radio, television system, or Global Positioning System ("GPS") device, or other device capable of receiving wireless signals. A wireless telephone or personal digital assistant ("PDA"), for example, may contain user identification information that may be used to obtain a user profile, which may be used, in turn, to select targeted programming for that user. In some cases, the presentation device 24 may even include programming segments stored in the memory of the device that may be used for targeted programming. In one embodiment, for example, the wireless device may include a processor that performs the role of the controller 26 by selecting programming segments depending upon the user profile and presenting that programming on the wireless device.

Figure 3:
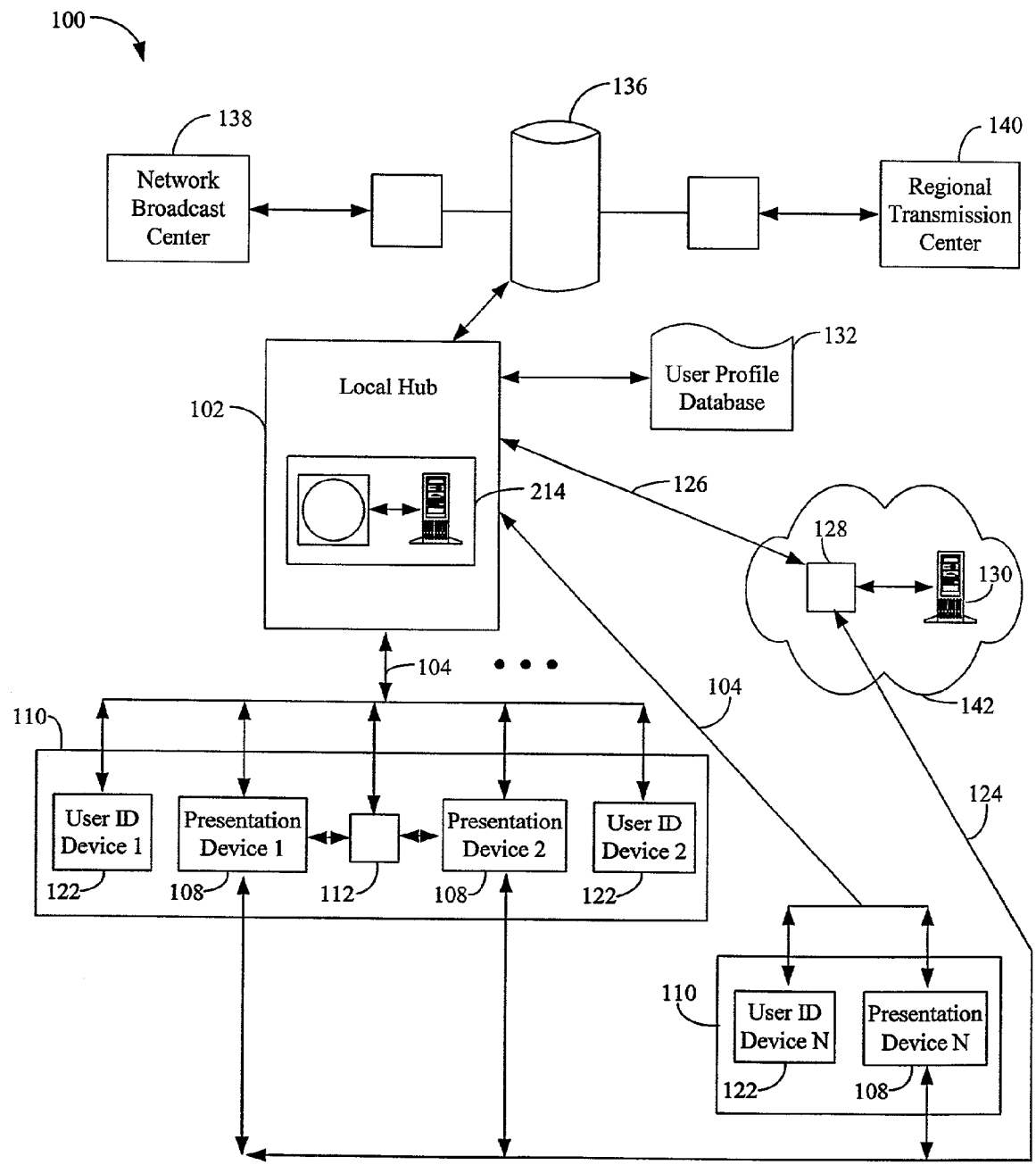
FIG. 3 is a block diagram depicting another embodiment of the various components and their interaction utilized in an alternative embodiment of the present inventive system and their interaction.

An alternative embodiment of a targeted programming system 100 of the present invention, which includes remote access to programming, is shown in FIG. 3. The presentation device 108 collects user identification and/or user profile information, such as through user input via a user interface device 122.

User identification and/or user profile information may be transmitted to the local hub 102 from the user interface device 122 via a communications link 104. In one embodiment, for example, the local hub 102 may use the identification information provided by the user interface device 122 to obtain or access user profile information from a user profile database 132. The user profile database 132 may be located at a local hub 102, at a reception site 110, or remote from the local hub 102 and reception site 110, but connected to one or both via a communications link or network. Alternatively, the user profile information may be obtained directly by the user interface device 122. For example, the user interface 122 may access the database 132 and obtain the user profile information for use by the user interface and/or to transfer to the local hub 102. In this embodiment, the user interface device 122 may, for example, include a smart card reader or other interface device 122 that obtains user identification information and/or user profile from a user identification device 148, such as a smart card or other device carried by the user.

The local hub 102, as shown in FIG. 3, provides programming to a user located at a reception site 110 outside of his or her home based upon user profile information for that user or for a group of users. Programming available for delivery to a user can be stored or generated at the local hub 102 or at locations remote from the local hub 102, such as, but not limited to, a network broadcast center 138, a regional transmission center 140, a location accessible over network 142, or at the reception site 110. The programming, for example, may be stored in one or more storage servers 214 at the local hub 102. The storage servers 214 (see also FIGS. 5 and 6) are preferably computer servers 134 that have a large data storage capacity and very fast file seek times for obtaining, storing, and retrieving programming. Storage servers 214 may alternately or additionally comprise programming files stored on media such as digital video disk 132, compact discs, CD-ROM discs, diskettes, ZIP™ disks and/or other disk formats or stored on media such as video tape, audio tape, memory cards, memory sticks and/or other storage mechanisms.

Since the capacity of storage servers 214 at any given local hub 102 may be limited, programming that is of a particular relevance to users at a particular reception site 110 may also and/or alternatively be stored locally at that particular reception site 110, such as on a storage device 112. Storage device 112 may include any data storage device known in the art such as the types described above with respect to storage server 214. The storage device may provide the stored programming back to the local hub 102 for retransmission to one or more presentation devices 108, or may push the programming directly to one or more presentation devices 108. This may provide the owner or operator of a particular reception site 110 the ability to design programming that is particularly applicable for users at that reception site 110. For example, an owner/operator of a particular reception site may provide advertising for various goods or services available for purchase, use, rental, and consumption at that particular site. Similarly, advertising for an affiliated business or other establishments may be provided. For example, a restaurant may provide advertising for a neighboring movie rental business while the customer is waiting for his or her food to be prepared.

The local hub 102 may also access programming files from other local hubs, regional transmission centers 140 or even to an original programming source such as a local or national broadcast center 138. If any of these broadcast or transmission center sources has the desired programming in their library, the programming can be transmitted to the local hub 102 or directly to the presentation device 108. The programming may, for example, be uplinked to satellite 136 and then downlinked to local hub 102 for retransmission to the presentation device 108. Alternatively, the programming can be transmitted directly to the presentation device 108. For example, the programming may be transmitted to the presentation device 108 via network 142.

Programming files for use in a targeted programming presentation may be additionally or alternatively accessed by the local hub 102 over a network 142, such as an intranet, extranet, LAN, WAN, or the Internet, via a communications link 126. The local hub 102 can access programming files from a remote file server 130 preferably through any standard file transfer interface or protocol 128, for example a World Wide Web interface. Programming could be transferred over the network 142 to the local hub 102 for transmission to the presentation device 108, or the programming could be pushed to the presentation device 108 over the network 142 directly from the remote file server 130 via link 124.

Programming can be transmitted to the presentation device 108 from the local hub 102 over communications link 104. The communications link 104 may include, but is not limited to, any digital or analog transmission medium, system, or device capable of communicating programming signals to a presentation device including, but not limited to: wireless transmission systems (for example, analog and digital television broadcasts, analog and digital radio broadcasts, analog and digital wireless communications networks, microwave systems, millimeter wave systems, infrared systems, and satellite broadcast systems); wire based transmission systems (for example, analog and digital cable systems, coaxial connections, fiber optic links, telephone systems, closed circuit systems, very high speed Digital Subscriber Lines (VDSL), VGD, and any other wired connection); stand-alone systems for providing pre-recorded programs (for example, programs provided on compact discs, digital versatile discs, video tape, PlayStation cartridges, memory sticks, magnetic storage mediums, optical storage mediums, data storage devices, Flash memory, random access memory (RAM), and read only memory (ROM)); and network connections (for example, the Internet, private network, public network, wireless network, wired network, ATM networks, wide area network, local area network), and intranet.

Presentation device 108 may be, for example, a printer, a television including HDTV or other video screen where the screen may comprise, for example, a tube, plasma, liquid crystal and other display systems, a personal computer, a speaker, a radio or other audio playback device such as an MP3 player, a video game console, a telephony device, a telephony answering device, a wireless device such as a wireless telephony device, an Internet-enabled telephone, a web pad, a web tablet, a personal digital assistant ("PDA"), and any other device capable of presenting a programming signal to a user. As described above with respect to the presentation device 24 shown in FIG. 2, the presentation device 108 may be a stand-alone unit that provides the targeted programming directly to the user, may be included in, utilized by or hosted by another device, or may include hardware and software components that allow the user to connect their own device to the presentation device 108. The presentation device 108 may also be fixed at a single reception site, or may be mobile such as through the use of wireless technology. The local hub 102 may be located at a particular reception site 110, or may be located remotely from the reception site(s) such, as shown in FIG. 3. For example, a local hub 102 may be located at a gas station and may provide programming to individual presentation devices 108 located at each of the gas pumps over a Local Area Network ("LAN"). The local hub 102 may also provide programming to one or more presentation devices 108 located off the premises of the reception site that the local hub 102 is located. Alternatively, the local hub 102 may be located off the premises of any of the reception site(s) 110 and may provide programming to one or more individual presentation devices 108 directly or may provide programming to a network located at the reception site 110 for retransmission to one or more presentation devices 108 located at the reception site 110. As such, it is to be appreciated that various other combinations of local hubs, regional hubs, remote hubs, reception sites and communication systems may be utilized by the present invention.

Figure 4:
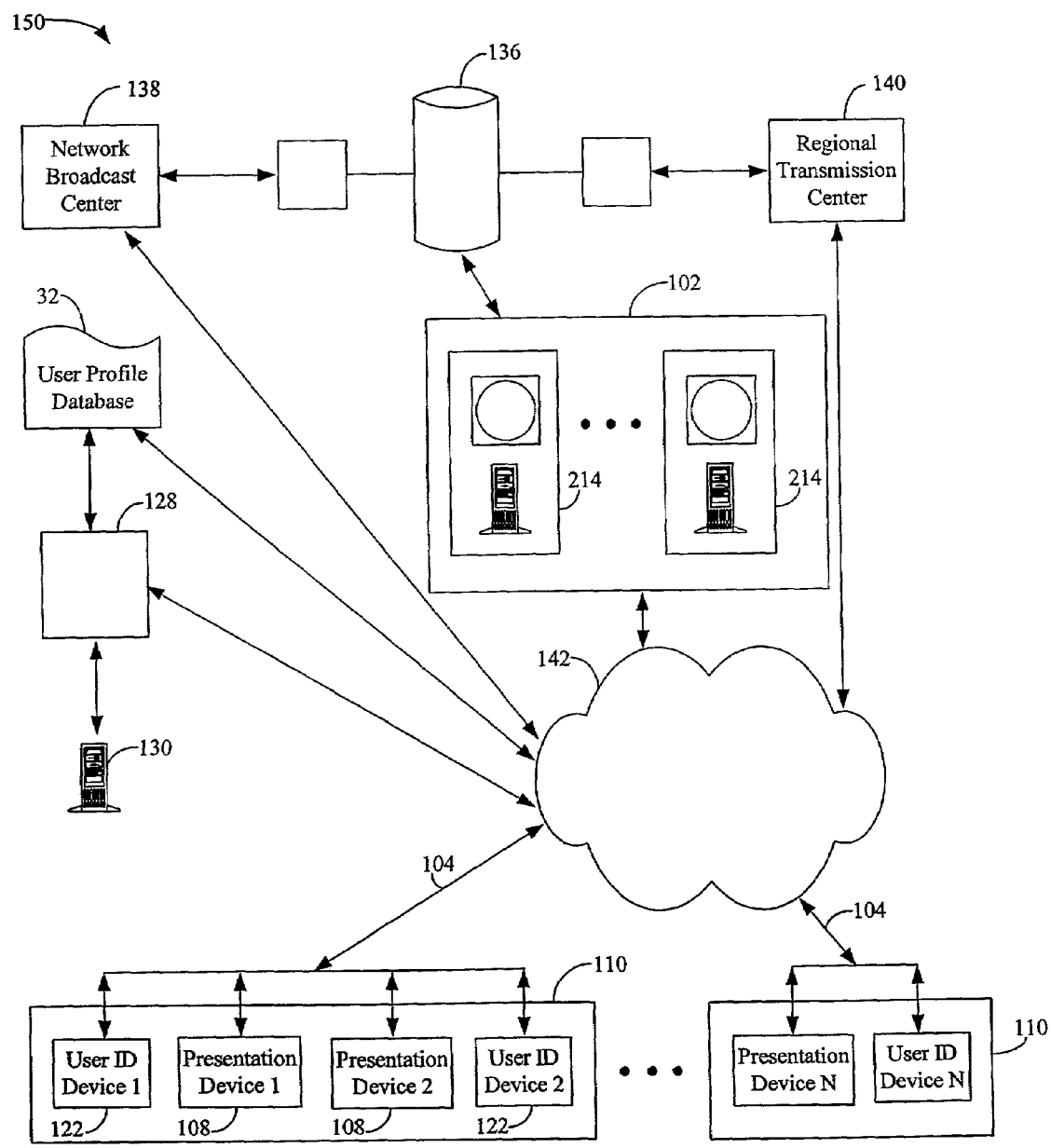
FIG. 4 is a block diagram depicting yet another embodiment of the present invention and the interaction of the various components provided in a network transmission system environment.

FIG. 4 depicts an alternative targeted programming system 150 that utilizes a network based transmission system. The network 142 may include, for example, a network such as a LAN, a WAN, an intranet, an extranet, or the Internet. In this embodiment, the targeted programming system 150 is connected to the presentation devices 108 over the network 142, rather than via the local hub and communications link 104 such, as shown in FIG. 3. The local hub 102 is connected to the network 142 and receives user identification information from the presentation device 108 via the network 142.

The local hub 102 also transmits programming to the presentation devices 108 via an information transfer protocol, for example, by streaming the program segments. Throughout this application "streaming" (a.k.a., "stream of data" or "streaming media") is defined in accordance with the definition provided by Webopedia (www.webopedia.com) as "a technique for transferring data such that it can be processed as a steady and continuous stream . . . [such that] a client browser or plug-in can start displaying the data before the entire file has been transmitted." Examples of technologies capable of supporting "streaming" include, but are not limited to, Progressive Network's RealAudio®, Real Network's Real Video®, Microsoft's NetShow®, and RTSP (Real Time Streaming Protocol). The present invention may utilize any of the various streaming technologies currently, or in the future, available as desired and/or as necessary to transmit media objects. Additionally, it is to be appreciated that non-streaming technologies may also be utilized in conjunction with the present invention including, for example, content presented via a compact disc or digital video disc, by completing a file transfer before beginning the presentation, or other transfer means.

In addition to the local hub 102, the regional transmission centers 140 and network broadcast centers 138 may similarly be connected to the network 142 and provide programming directly to the presentation device(s) 108 via the network. The network 142 may, for example, bypass the local hub 102 by transferring the programming components to the presentation device(s) 108. Additional information or programming may be available for access over the network 142 such as user profile information in a user profile database 136 or on a remote file server 132 via a file transfer interface 128, for example a World Wide Web site. The communications link 124 may be any conventional digital or analog transmission medium, system, or device capable of communicating programming signals to a presentation device including, but not limited to: wireless transmission systems (for example, analog and digital television broadcasts, analog and digital radio broadcasts, analog and digital wireless communications networks, microwave systems, millimeter wave systems, infrared systems, and satellite broadcast systems); wire based transmission systems (for example, analog and digital cable systems, coaxial connections, fiber optic links, telephone systems, closed circuit systems, very high speed Digital Subscriber Lines (VDSL), VGD, and any other wired connection); stand-alone systems for providing prerecorded programs (for example, programs provided on compact discs, digital versatile discs, video tape, PlayStation cartridges, memory sticks, magnetic storage mediums, optical storage mediums, data storage devices, Flash memory, random access memory (RAM), and read only memory (ROM); and network connections (for example, the Internet, private network, public network, wireless network, wired network, ATM networks, wide area network, local area network, and intranet. The programming presented via targeted programming systems 100 and 150 can be provided in multiple forms. The targeted programming can include every programming signal available for a targeted programming selection transmitted together so that switching between alternative programming segments to select targeted programming can be performed at each presentation device 108. This embodiment, however, can be limiting because the quantity of alternative programming segments available is limited as a function of the bandwidth of the communications links 104 and/or 124. A second embodiment may transmit certain programming segments to various users based upon constructed user profiles. This embodiment provides more targeted programming transmitted to a particular presentation device 108 within the bandwidth limitations and allows for additional customization through switching between alternative programming segments at the presentation device 108. A preferred embodiment provides for targeted programming, tailored to each user or to each particular group of users, and is preferably implemented by switching between programming segments at the local hub 102 prior to transmission, rather than at the presentation device 108.

When the targeted programming system switches between programming segments, the system is preferably able to seamlessly switch between digital programming signals, whether representing independent programming segments or alternative, related programming segments within one interactive program. The term "programming segments," as used within this application, preferably refers to any cohesive set of programming content. Examples of sets of such programming content include a television program, a film, a song, a commercial, a music video, and a story in a newscast. However, programming segments could be shorter clips or "bites" of programming content if that is what is desired for presentation. "Seamless switching" is defined as switching between programming segments in a transport stream 104 that does not produce user perceptible artifacts. The process of encoding the programming content at the local hub 102 is the key to a simple yet effective seamless switch. This process is discussed in detail in U.S. patent application Ser. No. 09/687,866 entitled "CUSTOMIZED PROGRAM CREATION BY SPLICING SERVER BASED VIDEO, AUDIO, OR GRAPHICAL SEGMENTS" filed by Kevin Liga and Frank Deo on Jan. 22, 2001, which application is incorporated by reference into this application in its entirety.

Figure 5:
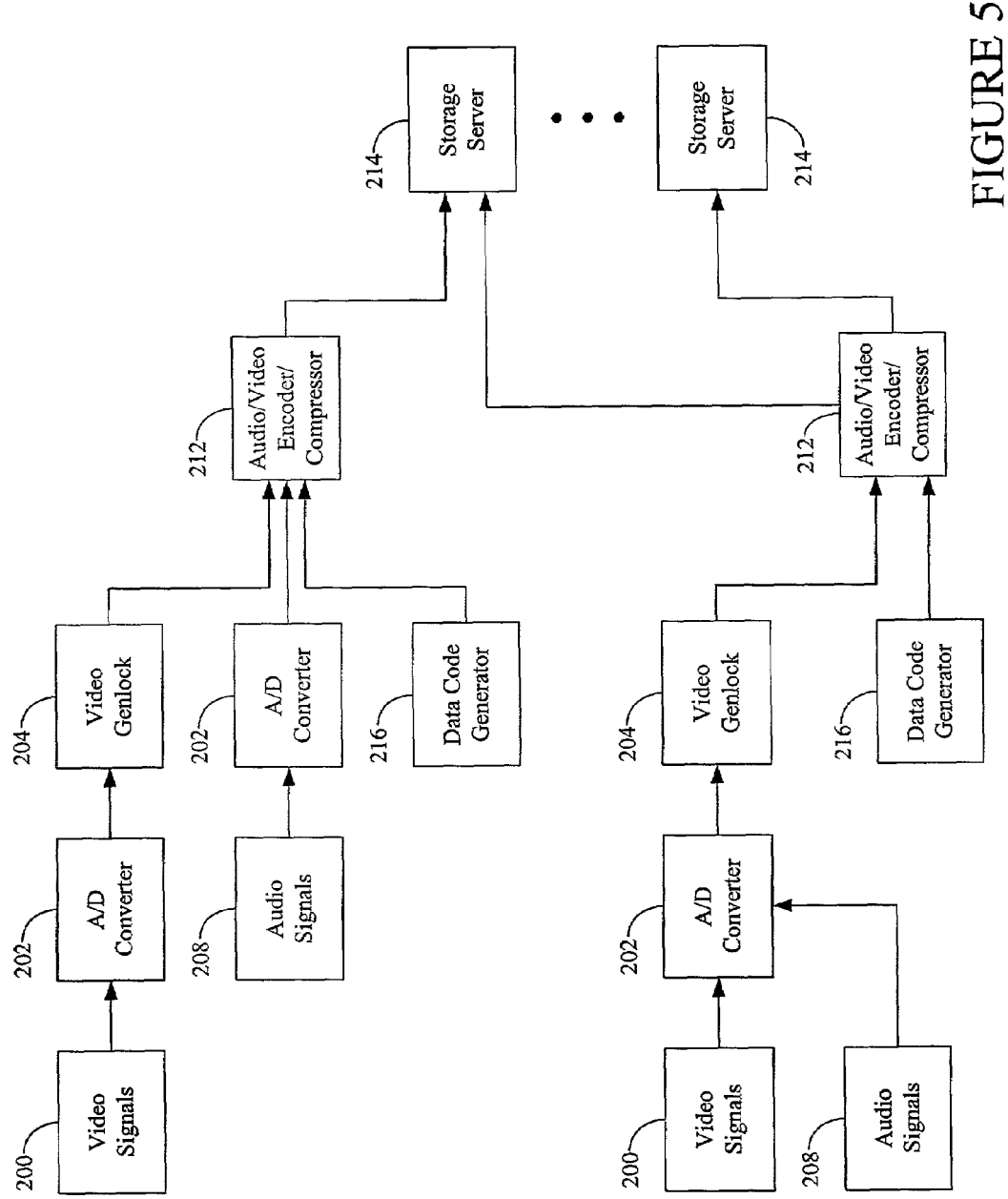
FIG. 5 is a block diagram of an encoding and compression system for storing programming signals on storage servers.
Figure 6:
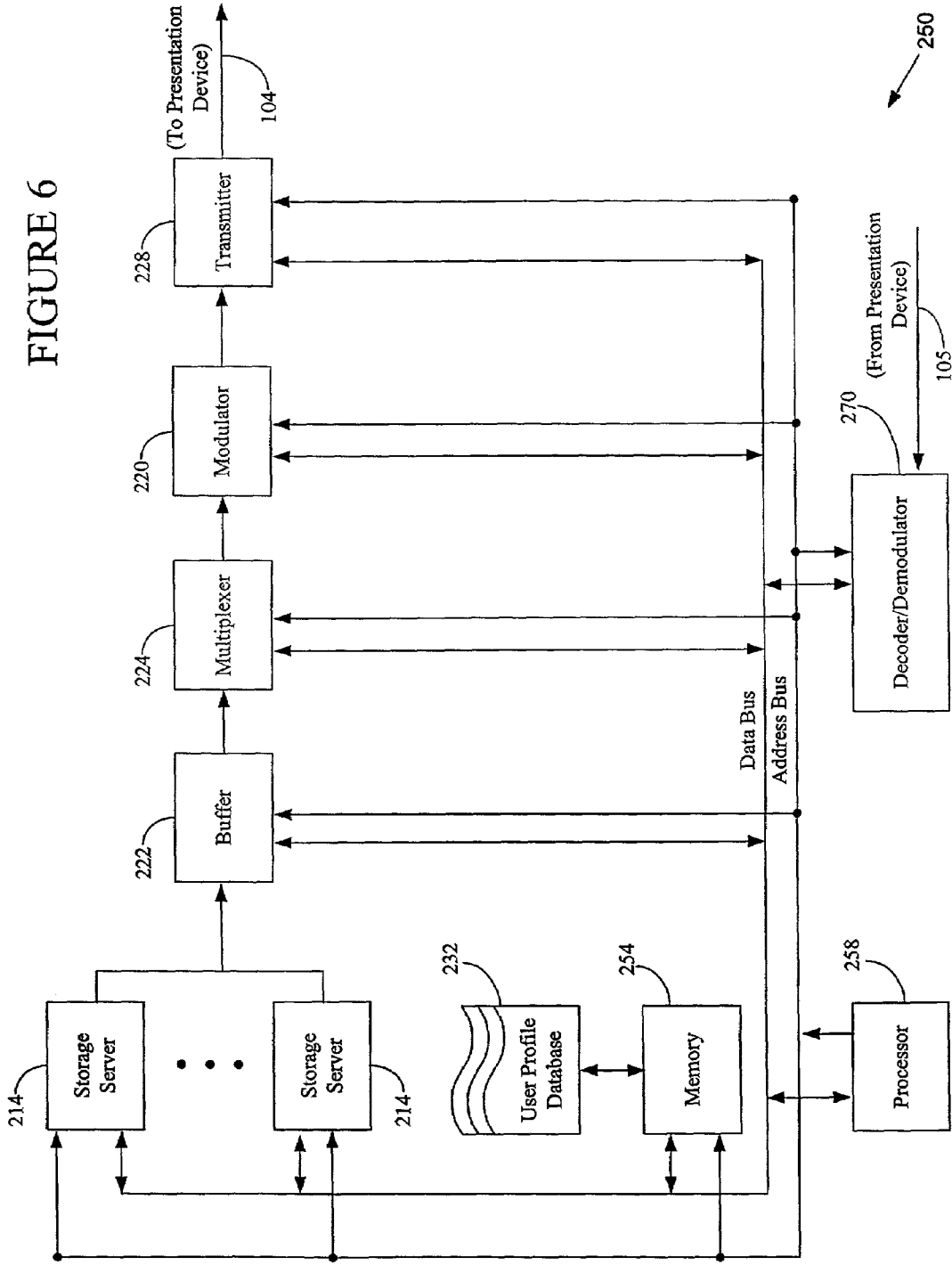
FIG. 6 is a block diagram of one embodiment of a programming transmission system of the present invention.

As shown in FIGS. 5 and 6, a plurality of video signals 200, or other programming signals constituting programming components for a plurality of targeted programming presentations can be simultaneously transmitted to a plurality of presentation devices 108. Other programming signals, in lieu of or in addition to video signals 200 may include, for example audio signals 208, graphic signals, text signals, still frame image signals, multimedia, streaming video, animation, and/or executable object or application code, which are collectively referred to as "programming signals." Programming signals, such as video signals 200, may be any signals suitable for interactive operation. Various types of time and content related video, audio, graphic, and other programming signals exist that are suitable for interactive operation.

Targeted programming is preferably provided to the local hub 102 (shown in FIGS. 2-4) in a pre-digitized and/or pre-compressed format. FIG. 5, for example, shows one possible embodiment of a system that may be used to digitize and/or compress programming signals, such as video signals 200 and audio signals 208, for storage in servers 214. Servers 214 may, for example, be accessed by the targeted programming system such as described above. The origin of the video signals 200 could be, for example, from video servers, video tape decks, digital video disks ("DVD"), satellite feed, cameras for live video or other sources. Some of the video signals 200 may already be in a digital format such as Motion Pictures Expert Group ("MPEG") standards, high definition television ("HDTV"), or European phase alternate line ("PAL") standards. Audio signals may be counterparts to one or more other programming signals, such as video signals 200, or may originate from compact digital disks ("CD"), magnetic tapes, microphones or other audio recording media. Programming signals, such as video signals 200 and audio signals 208, that are in an analog format are preferably directed to analog-to-digital ("A/D") converters 202 as shown in FIG. 5. Preferably, video signals 200 are digitized using MPEG standards and audio signals 208 are digitized using the Dolby® AC-3 format; however, any conventional A/D encoding scheme may be used. Programming signals that are already in a digital format, however, may bypass the A/D converters 202.

The A/D converters 202 convert the various analog video signals 200, audio signals 208 and/or other programming signals into a digital format. A/D converters 202 may be of any conventional type for converting analog signals to digital format. It is to be appreciated that individual A/D converters 202 may not be needed for each type of programming signal. Additionally, various A/D converters 202 are capable of digitizing various types of programming signals including video signals 200 and audio signals 208. The plurality of video signals 200 can be further genlocked in a video genlock device 204, thereby time synchronizing various video and audio programming segments.

The data code generator 216, can create data codes. These data codes may include commands for controlling the processing of the programming by the targeted programming system. The data codes may also include updates of system software for the targeted programming system, direct address data for making certain programming available to the user (e.g., subscriber access or pay-per-view events) and other information. Preferably, the data codes originating in the data code generator 216 are part of an interactive scripting language, such as ACTV® Coding Language, Educational Command Set, Version 1.1, and ACTV® Coding Language, Entertainment Command Extensions, Version 2.0, both of which are incorporated herein by reference. These data codes facilitate multiple programming options, including the programming segment selections and the seamless switching between programming segments by the targeted programming system. The data codes may also provide the information necessary to link together the different programming segments based upon user profile information or user response or selection.

The digitized, time synchronized programming signals and data codes can then be directed into the audio/video encoder/compressor (hereinafter "encoder") 212. Compression of the various programming signals may be performed, such as to allow a plurality of signals to be transmitted over a single NTSC transmission channel. Preferably, the encoder 212 uses a standard MPEG-2 compression format. However, MPEG-1, MPEG-4 and other compression formats, such as wavelets and fractals, could be utilized for compression. These techniques are compatible, for example, with the existing Advanced Television System Committee of America ("ATSC") and digital video broadcasting ("DVB") standards for digital video systems. With respect to the targeted programming system of the present invention, compression by the encoder 212 may additionally provide the ability to store a greater volume of programming on storage servers 214. It may be desirable in some instances to additionally have a transcoder component as part of transmission system 250. For example, if program segment content is accessed from foreign broadcasting sources, it may be in an incompatible format (e.g., DVB) and need to be transcoded to ATSC format before it could be transmitted for reception by a particular presentation device 108 in the United States.

As with other programming in a digital interactive programming system, if multiple encoders 212 are used to compress programming segments for use in the targeted programming system, the encoders 212 are preferably synchronized to the same video clock. This synchronized start ensures that splice points placed in the MPEG data packets indicate switches between programming segments, particularly from or to video signals 200, so that the switches occur at the correct video frame number. SMPTE time code or vertical time code information can be used to synchronize the encoders 212. This level of synchronization is achievable within the syntax of the MPEG-2 specifications. Such synchronization provides programming producers with the ability to plan video switch occurrences between separately encoded programming segments.

The digitized programming signals—including the video signals 200, audio signals 208, and data codes—constituting the programming segments can be packetized and interleaved in the encoder 212, preferably according to MPEG specifications. The standard MPEG compression and encoding process assigns packet identification numbers ("PID"s) to each data packet created. Among other information, the PID identifies the type of programming signal in the packet (e.g., audio, video, and data) so that upon reception at a user device 108 the packet can be directed by a demultiplexer/decoder to an appropriate digital-to-analog ("D/A") converter. PID numbers may be obtained from the MPEG-2 transport table.

MPEG encoding also incorporates a segment in each data packet called the adaptation field that carries information to direct the reconstruction of the video signal 200. The program clock reference ("PCR") is a portion of the adaptation field that stores the frame rate of an incoming video signal 200, clocked prior to compression. This ensures that a demultiplexer/decoder in a user device 108 can output the decoded video signal 200 for presentation at the same rate as it was input for encoding to avoid dropping or repeating frames. Additional embedded information in the MPEG stream normally includes a presentation time stamp and a display time stamp. These time stamps can be used to maintain lip synchronization between the video and audio, and also to inform the user device 108 when to present the video and audio to the user.

Once the various programming signals are encoded and compressed by encoder 212, they are preferably output for storage in storage servers 214. Storage servers 214 are preferably located at a local hub 102 such as shown in FIGS. 3 and 4 but, as previously noted, they may be in other physical locations within the targeted programming system 100 or 150 for ready access of programming components. When the targeted programming system 100 or 150 determines that it is appropriate to transmit a targeted programming segment, the stored programming signals comprising the desired programming segment can be accessed from the storage servers 214 and are further processed for transmission by a transmission system 250, shown in FIG. 6, at the local hub shown at FIGS. 2-4.

FIG. 6 shows a block diagram of one embodiment of the present invention in which a local hub may be used to select one or more programming segments and to transmit it to a presentation device, such as the presentation device 108 shown in FIGS. 3 and 4. In this embodiment, after the various programming signals are selected from the storage servers 214 or other sources such as live programming feeds, they can further be rate controlled for transmission by the buffer 222. The buffer 222 controls the rate of transmission of the data packets to the presentation device 108 so that it does not overflow or under-fill while processing. The physical buffer size of the buffer 222 can be defined, for example, by the MPEG standard. Enough time is preferably allowed at the onset of the transmission process to fill up the buffer 222 with the compressed data to ensure data availability for an even transmission rate.

The multiplexer 224 then combines the encoded and compressed programming signals comprising the targeted programming segments as they are output from the buffer 222 with other programming signals and data to create a data stream for transmission, such as over communications link 104 within an NTSC channel or other transmission medium. By multiplexing a plurality of disparate signals, the number of data streams to be carried by the communications link 104 can be reduced. The multiplexed data streams can then be modulated for transmission by modulator 220. The modulator 220 may utilize one of several different possible modulation schemes. Preferably, 64-QAM (quadrature amplitude modulation) is chosen as the modulation scheme; however, any other conventional modulation scheme such as FSK (frequency shift keying), n-PSK (phase shift keying), and VSB (vestigial side band), can be used. With 64-QAM, the data rate at the output of the modulator 220 is about 29.26 Mbps. Examples of other modulation schemes that can be used with the present invention, with respective approximate data rates, include: 256-QAM (about 40 Mbps); 64 QAM PAL (about 42 Mbps); 256 QAM PAL (about 56 Mbps); and 8 VSB (about 19.3 Mbps).

For transmission over telephony systems, the compressed and encoded programming signals are preferably output in Digital Signal 3 (DS-3) format, Digital High-Speed Expansion Interface (DHEI) format, or any other conventional format. In some transmission systems, for example fiber optic, these RF modulation schemes are unnecessary as the transmission is purely digital. Further, the programming signals can also be formatted in Internet protocol, or other network protocol, and streamed over the Internet or other communication network to user devices 108.

Once modulated, the data stream can be output to the transmitter 228 for transmission, such as over one of the many NTSC channels available for broadcast. The transmitter 228 may transmit the data transport stream over communications link 104, which may include, for example, any digital or analog transmission medium, system, or device capable of communicating programming signals to a presentation device including, but not limited to: wireless transmission systems (for example, analog and digital television broadcasts, analog and digital radio broadcasts, analog and digital wireless communications networks, microwave systems, millimeter wave systems, infrared systems, and satellite broadcast systems); wire based transmission systems (for example, analog and digital cable systems, coaxial connections, fiber optic links, telephone systems, closed circuit systems, very high speed Digital Subscriber Lines (VDSL), VGD, and any other wired connection); stand-alone systems for providing pre-recorded programs (for example, programs provided on compact discs, digital versatile discs, video tape, PlayStation cartridges, memory sticks, magnetic storage mediums, optical storage mediums, data storage devices, Flash memory, random access memory (RAM), and read only memory (ROM)); and network connections (for example, the Internet, private network, public network, wireless network, wired network, ATM networks, wide area network, local area network, and intranet).

Any known protocol, such as RTP, UDP, TCP/IP and ATM, may be used to transmit the data signals over one or more network. The transmission system may also be a telephony system transmitting a digital or analog data stream. Thus, a multiplexed data stream containing several channels including the targeted programming content may be sent directly to a presentation device 108 over a telephone line. The aforementioned digital transmission systems may include and utilize systems that transmit analog signals as well. It should be appreciated that various systems, mediums, protocols and wave forms may be utilized in conjunction with the systems and methodologies of the present invention. In one embodiment for example, the data stream is distributed to remote user sites via cable, DBS, or other addressable transmission mediums.

In narrow bandwidth transmission systems, such as cellular/wireless telephony or PCS networks, still frame pictures or graphics, such as images compressed in JPEG format, may comprise the programming content as opposed to moving video or other signals requiring greater bandwidth. Such still pictures or graphics could be presented on communications devices such as personal digital assistants (e.g., Palm Pilot™), telephones, wireless telephones, telephony devices for the deaf, or other devices with a liquid crystal display (LCD) or similar lower resolution display. The programming content may additionally include textual information or an audio message. Similarly, all-audio or all-textual programming content could be provided, such as via a radio transmission system.

A processor 258 preferably coordinates and controls the functions of the storage servers 214 and transmission components such as the multiplexer 224, modulator 220, and the transmitter 228. The processor 258 can direct the selection and transmission of particular programming segments based upon system software stored in memory 254, preferably ROM, or from data codes stored with programming segments in the storage servers 214. A user profile database 232 that collects and stores user profile information for targeting the programming segment selections may be a part of the memory 254, or may be a separate but integrated system, as indicated in FIGS. 2, 3 and 4. A decoder/demodulator 270 can receive user identification information, interactive user inputs, viewing habits, and general information about a user from a connected presentation device 108. This connection may be via a communications link 105. The communications link 105 may be the same link as communications link 104, may be a portion of communications link 104, such as a backchannel, or maybe a separate link from communications link 104.

Figure 7:
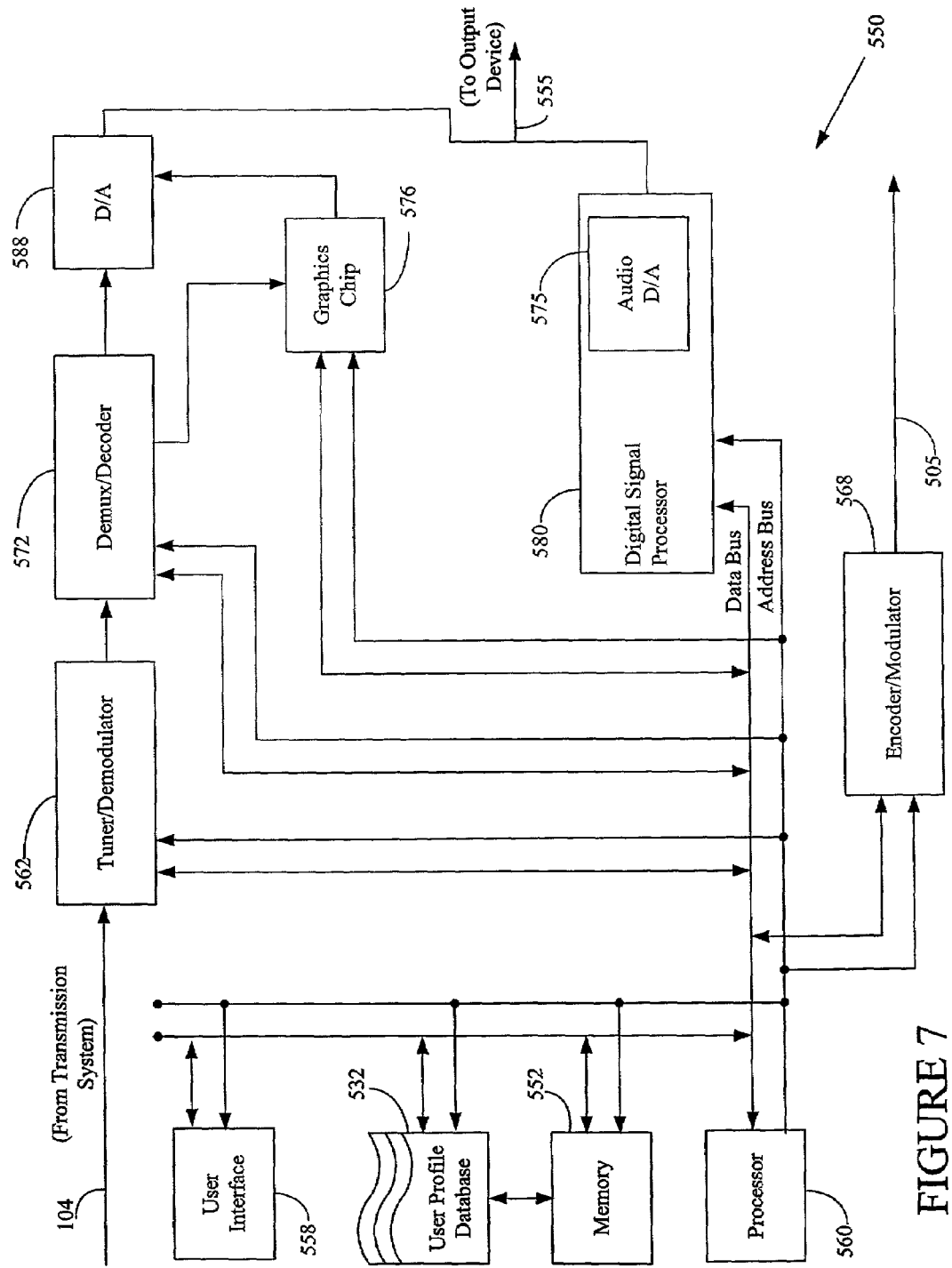
FIG. 7 is a block diagram of one embodiment of a receiver component of the present invention.

The presentation device 108, shown in FIGS. 3 and 4, may include a receiver 550, such as shown in FIG. 7, and an output device 555 for presenting programming to a user. The receiver 550 is capable of receiving the signal from the local hub 102 and transforming that signal into a form that may be output on the output device 555. The receiver 550, for example, may receive a broadcast TV signal and transform it into audio and video signals that may be output from the speaker and display elements of the output device 555. Alternatively, the receiver 550 may be a separate component from the presentation device 108 such as a set-top box. The system may include one separate receiver for each presentation device 108 that does not have an integrated receiver 550, or may have one or more receivers 550 that provide signals to more than one presentation device 108 at a particular reception site 110.

FIG. 7 shows an alternative embodiment of the present invention. In the embodiment shown in FIG. 7, a receiver 550 receives a signal and selects at least one programming segment based at least in part on the user profile database 532. In this embodiment, the receiver 550 may be a portion of the presentation device 108, shown in FIG. 3 and 4, may be a separate receiver for a particular presentation device 108 (such as a set-top box), or may be located at a reception site 110, as shown in FIGS. 3 and 4, and select programming for one or more presentation devices 108 located in the reception site. As shown in FIG. 7, a signal may be received via the communications link 104 by the tuner/demodulator 562. The tuner/demodulator 562 may include, for example, a wide band tuner, in the case of satellite distribution, a narrow band tuner for standard NTSC signals, and/or two or more tuners for switching between different signals located in different NTSC frequency channels. The tuner/demodulator 562 can tune to the particular NTSC channel at the direction of the processor 560. The processor 560 is preferably a Motorola™ 68331 processor, but may be any conventional processor including PowerPC™ and Intel Pentium™ processors. The tuned channel is then demodulated by the tuner/demodulator 562 to strip the transport stream 104 (as depicted in FIG. 2) from the carrier frequency at the desired channel in the received transmission.

The demodulated signal is then forwarded to the demultiplexer/decoder ("demux/decoder") 572 of the receiver 550. At the demux/decoder 572, the packets in the signal are separated and decompressed. Preferably, each incoming data packet in the signal has its own PID. The demux/decoder 572 strips off the PID for each packet, and sends the PID information to the processor 560. The processor 560, at the direction of system software stored in the memory 552, identifies the next appropriate packet to select for presentation to the user by comparing the PID to selection information or other criteria. The demux/decoder 572 then reconstitutes the selected digital programming signals from their packetized and compressed form and routes them to an appropriate digital to analog ("D/A") decoder, whether video, audio, or otherwise.

The memory 552 is preferably ROM, which holds operating system software for the receiver 550, and is preferably backed up with flash-ROM to allow for the reception and storage of downloadable code and updates. In one embodiment, the system software can access and control the hardware elements of the device. Further, new software applications may be downloaded to the receiver 550 via either the communications links 104 or 105 from the transmission system 250, shown in FIG. 6. These applications can control the receiver 550 and redefine its functionality within the constraints of the hardware. Such control can include, for example, control of a front-panel display, on-screen displays, input and output ports, the demux/decoder 572, the tuner/demodulator 562, the graphics chip 576, and the mapping of the user interface 558 functions.

Additional memory 552 in the form of RAM or a storage server may be used at the receiver 550 in order to store programming segments, either temporarily for incorporating into a targeted program, or for a longer period if the program segment is likely to be repeatedly desired or used in targeted programming for the particular user or at the particular presentation device 108 (shown in FIGS. 3 and 4). A programming segment could also be transmitted earlier than the desired presentation time and stored in memory 552 to be used to further customize a later transmitted program segment.

A targeted programming system, such as the systems 100 and 150 shown in FIGS. 3 and 4, may also receive feedback from the user at the presentation device 108. The feedback can be collected and used immediately to provide targeted programming content to the user, can be stored in memory 552 for later use with other programming selection needs, including targeted programming selection, and/or can be used to update the user profile database 532. This system can be implemented as a software application within the receiver 550 and is preferably located within ROM or flash-ROM memory 552. The interactive system software, however, could alternatively be located in any type of memory device including, for example, RAM, EPROM, EEPROM, and PROM. The system may solicit information from the user by presenting interactive programming segments, which may provide questionnaires, interrogatories, programming selection options, and other user response sessions. The user may respond to such queries through the user interface 558. A user may interact with the user interface 558, for example, via an infrared or radio frequency remote control, a keyboard, touch screen technology, voice activation, or any other interactive technology known in the art.

The receiver 550 may also include an encoder/modulator 568 for transmission of data to other components of the system. For example, the communications link 505 may correspond to links 104 and/or 124 (shown in FIGS. 3 and 4). Data transmitted over the communications link 505 may include user identification or profile information collected at the receiver 550 such as from direct user input, including interactive selections, made via the user interface 558. The encoder/modulator 568 can also receive data from other components of the system via communications link 505, including, but not limited to, software updates from the local hub and user profile information from the user profile database 532, which may be internal or external to the receiver 550. The communications link 505 may be any appropriate communication system such as broadcast, cable or other co-axial system, satellite, DBS, fiber optic, microwave, radio, telephony, wireless telephony, DSL, PCS networks, the Internet, public networks, private networks, T-1 upstream, or any other transmission means.

Reconstructed video segments can be output from the demux/decoder 572 to the D/A converter 588 for conversion from digital-to-analog signals for final output to a presentation device 555 (as shown in FIGS. 3 and 4). Such D/A conversion may not be necessary within the receiver 550 if the presentation device 555 is also a digital device or if the signal had been transmitted as an analog signal.

Graphics components may be output from the demux/decoder 572 to a graphics chip 576 to transform the graphics to a video format. The graphics components can then be prepared for output to the presentation device 108 in the video D/A converter 588. Video and graphics components (as well as audio and other components) may also be temporarily stored in memory 552, or in a buffer, for rate control of the presentation or other delay need (for example to store graphic overlays for repeated presentation), prior to digital-to-analog conversion by D/A converter 588.

The associated audio programming components may be decoded by demux/decoder 572 and sent to a digital signal processor 580. The digital audio programming components are transformed into analog audio signals by audio D/A converter 575 for output to the presentation device 108. The digital signal processor 580 can be a Dolby® digital processing integrated chip for the provision of, for example, surround sound, which includes an audio D/A converter 575. Data codes can also be separated from the signal by the demux/decoder 572 and provided to the processor 560 for processing of data commands.

It may be appreciated that, depending upon the number of presentation devices 108 (shown in FIGS. 2 and 3) supported by a particular local hub, a targeted programming system may require a significant infrastructure of switching equipment at that local hub 102. Further, in a transmission system 250 comprising a distribution network, each presentation device 108 in a targeted programming session may be assigned a single transmission interface such as a socket connection to allow for one to one targeted programming. These transmission interfaces may be dynamically allocated to active presentation devices 108. At the local hub 102, a single interface may be assigned to a single presentation device 108 so the number of interfaces present at the local hub 102 can be the limiting factor to the number of presentation devices 108 that can participate in a targeted programming session simultaneously. If it is assumed that only a portion of the presentation device 108 will interact simultaneously, an algorithm can be used to determine the optimum number of central switches necessary to assure an acceptable percentage of access.

Other configurations of distribution networks are possible to reduce the one to one need. Parallel processing capabilities can accommodate multiple, simultaneous accessing of programming from the storage servers 214 and switching between data streams. Further, nodal distribution systems using multiple servers can accommodate significant numbers of presentation devices 108. The system software can replace the hardware to perform the switching operations and increased demand can be accommodated by the provision of larger or additional servers. Digital transmission systems provide increased bandwidth and a larger channel capacity so that targeted programming could be provided to multiple presentation devices 108 through the unused channel capacity. In fact, with some transmission systems such as fiber optic, bandwidth may not be an issue for many purposes and demand can be met through the capacity of the transmission system itself.

The targeted programming content delivery system of the present invention preferably includes at least one user profile database 32 that stores information about individual users or groups of users, such as shown in FIGS. 2-4, or may include a connection, such as via a network, to a user profile database that is external to the system of the present invention. The user information stored in database 132 can be used to more accurately provide appropriate and targeted programming. Such information can be as simple as geographic location, which may also provide some demographic overtones. It is preferable, however, to have as much information as possible about individual users, or at least groups of users such as sports fans, music fans, and art aficionados, in order to provide targeted programming as accurately as possible. In one embodiment, for example, each of the users may have the option of registering their individual preferences such as through the use of a questionnaire. User information may then be used to establish a user profile in the user information database 132. The system may alternatively or additionally include an interactive programming guide that allows a particular user to select programming content at the presentation device 108. A particular user's selection may be analyzed and used to update or establish a user profile in the user profile database 132. The user information in the database 132 may be updated directly by the user or by a system manager to reflect changing or more detailed profile information.

Figure 8:
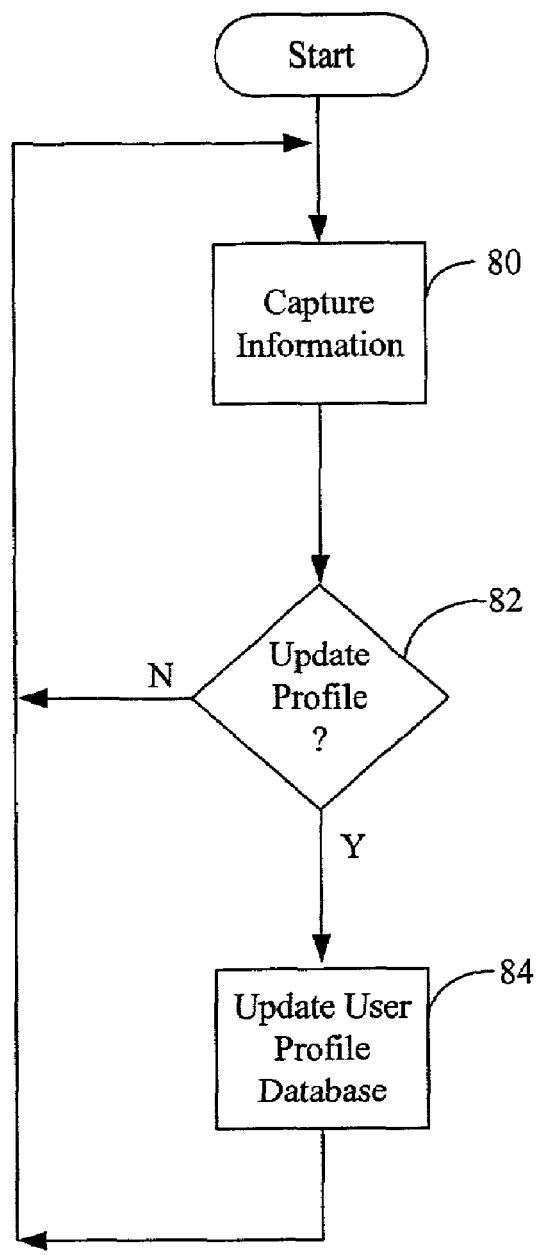
FIG. 8 is a process flow chart of one embodiment of a method of updating a user profile database of the present invention.

Referring to FIG. 6, the user profile database 232 may provide information about a user in order to more accurately provide appropriate targeted programming. In one embodiment, the targeted programming system may capture information about a user by monitoring a transaction at one or more of the reception sites 110 (shown in FIGS. 3 and 4) of the targeted programming system. As shown in FIG. 8, if a user completes a transaction, personal identification information for that user and/or information about the transaction itself is captured at step 82. If the transaction was the purchase of gasoline, for example, the identification information such as credit or debit card numbers, license plate numbers, other user identity information maybe captured. Additionally or alternatively, other information about the transaction, such as, the type and grade of gasoline purchased, if any other items or services were purchased, or if any services such as an oil change were performed may be captured. Then a determination whether the captured information should be used to update a user profile is made at step 82. If a determination to update a user profile is made in step 82 then some, or all, of the captured information may be stored in the user profile database 32 at step 84.

Preferably, the user profile database 32 comprises a central database that is shared by multiple reception sites, local hubs 102, regional transmission centers 140 and/or networks 142. For example, information collected at one location may be used to select targeted programming when the user is present at another location. Thus, user profile information can be collected from different types of transactions, allowing for a more complete user profile to be collected for a user. As more information is collected about a user, the targeted programming system may provide more appropriate targeted programming for delivery to the user. Further, information may be collected from other sources outside of the targeted programming system such as marketing. The marketing information, for example, may be collected from sources such as mailing lists or other information that may be obtained from a third party or may be collected from other forms of marketing research known in the art.

As shown in FIG. 6, the user profile database 32 may be accessed by the processor 258 to obtain a user profile for use in the selection of targeted programming to a user. The database 32 may be implemented using any known data base structure. In one particular embodiment, for example, the database 32 may include a system and method for providing a user profile database such as disclosed in U.S. patent application Ser. No. 09/409,305 entitled "Enhanced Video Programming System and Method Utilizing User-Profile Information," filed by Craig D. Ullman, et al., which is incorporated herein by reference. The system and method for providing a user profile database includes one possible implementation of collecting, processing, managing, and using user profiles that may be used to make programming segment selections. In this embodiment, the user profile database 32 may include a "donut" of dynamic, hierarchical, shared user profile information that has been collected. A donut, for example, may specify the following: user characteristics, purchase histories, viewing preferences, hobbies, geographic location, and spending habits among others. The donut may contain a user profile or act as a key to a data repository containing it, and it may be stored in a file-type structure on a computer-readable medium such as a memory. As shown in FIGS. 3 and 4, the donut may be accessed by the local hub 102 from the user profile database 32 for use in selecting and/or routing programming to a user associated with the donut.

A donut, more specifically, is a hierarchical attribute value pair data structure, including a collection of "crumbs". A crumb is the smallest unit of data corresponding to a meaning value pair associated with a particular donut. For example, a user's age would be a crumb associated with the user's primary donut. The donut data structure includes names plus associated crumbs. At the top level of the hierarchy, a top donut is associated with a user. Each donut contains a set of crumbs and a set of "sub-donuts."

A sub-donut is a donut associated with another donut rather than an external entity such as, for example, a user. An example of a sub-donut is a user's address. The user's address references the user's primary donut and is stored in a sub-donut within the user profile database 32, and the sub-donut contains crumbs for each piece of information in the address. Donuts are stored with hierarchical relationships, meaning that a donut can have associated sub-donuts and the sub-donuts can also each have associated sub-donuts. The donut thus may have many levels of sub-donuts within its hierarchical structure.

Some donuts are owned by only one parent donut, while other donuts are shared among several or many parent donuts. These shared donuts may profile, for example, an entity, that is common to all. For example, a shared donut may include a group of users that share common profile characteristics such as, but not limited to, a family, a team, members of the same income level. This provides a way to identify a group of users. In the present context, targeted programming may be selected for presentation to a group of users who share similar profile characteristics. The user profile may contain a wide variety of information concerning user characteristics for use in determining programming to present to a user. The programming may include any type of information such as video, audio, graphics, text, and multimedia content. Examples of programming to be selectively presented to a user as part of the targeted programming system based at least in part upon the user profile information include, but are not limited to, the following: advertisements, player profiles for sporting events, music or other audio information, icons representing particular services, surveys, news stories, and program suggestions. As shown in FIG. 8, a user's donut may be dynamically modified and updated to further fine-tune the process of selecting programming to present to a user based upon the user's donut. In an advertising context, for example, answers to survey questions may be used to provide a second level of information within an advertisement presented to a particular user. The targeted programming system may use demographic data in a user's donut, for example, to determine which advertisement or survey to present to the user. The user's answers to questions in the survey may be used to present additional advertisements to the user or additional programming related to the advertisement previously presented. It is to be appreciated that the programming may be pushed to or pulled by the user based upon the donut or other user profile information.

The transmission system 250 processor 258 (shown in FIG. 6) and/or the receiver 550 processor 560 (shown in FIG. 7) may monitor the user's activity in order to dynamically update the user's donut. The user's activity may involve any type of information relating to the user's transactions at the reception sites or interaction with the targeted programming system. For example, the targeted programming system may detect the following: transactions completed; programming viewed by the user; programming interacted with by the user; the amount of elapsed time the user has remained at the presentation; the extent to which the user participates in interactive segments; other input from the user; and any other such information.

The targeted programming system may also determine whether to update the user's donut based upon the monitored user activity such as shown in FIG. 8. This determination, shown at step 82, may be based upon particular criteria related to the user's activity. For example, particular types of activity or thresholds for activity for comparison to the user's monitored activity may be stored in the user profile database 32 to provide for an update when the user's activity matches the particular types of activity or exceeds the thresholds. The database 32 may also be updated based upon answers to survey questions. If the processor 258 of the transmission system 250 determines based on the criteria that the user's donut is to be updated, it can dynamically updates the donut based on the user's activity, and saves the updates in the user profile database 32. Otherwise, if the criteria have not been met, the processor 258 does not update the donut.

This donut methodology can be translated from an individual user based profile to a macro scale providing, for example, local, regional, and system-wide profiles or profiles of other groups of users. These macro system profiles can be used in the selection of programming for storage in storage servers 214 at particular system sites 110 or at particular local hubs 102. For example, particular programming, such as advertising for a regional chain of restaurants, may have particular relevance to users who live in the southeastern United States of America, while not commanding any sizeable audience in Utah. In this case it would not make sense for local hubs 102 in Utah to store that particular programming in their storage servers 214. If a user from the southeastern United States is identified at a presentation device 108 located in Utah, however, the local hub 102 in Utah may request a particular programming segment from a remote location, such as from a local hub 102 or regional transmission center 140 located in the southeastern United States as described above with reference to FIGS. 3 and 4.

Creating regional and system-wide donut profiles can sensibly allocate programming storage to locations of highest relevance. Programming that is universally applicable may be redundantly stored at multiple local hubs 102 to accommodate demand. The length of time that particular programming is saved in storage at a particular transmission system location may be part of the donut variables as well. Factors, such as strength of demand, the average window in which users will respond to such programming, the timeliness or currency of the programming (e.g., a weather forecast), and other factors, can be used in a donut scheme to for stocking and turning over the programming libraries stored and/or accessed by within the targeted programming system.

Through the combination of the data storage and accessing capabilities, identification of a user, and the methodology of profiling user information and selecting programming content targeted to that profile, the inventive concept of targeted programming is achieved. In this manner, users benefit from receiving programming and advertisements that are targeted to them while they are outside their homes. In turn, advertisers and other programming designers are able to more particularly target users with a potential affinity for a particular product, service or programming.

It is to be appreciated that the software that causes a computer to perform the method of the present invention or that is part of the system of the present invention may be stored on any storage medium known in the art. For example, the software may be stored on a medium such as a servers, digital disks, compact discs, CD-ROM discs, hard drives, diskettes, ZIP™ disks and/or other disk formats or stored on media such as video tape, audio tape, memory cards, memory sticks and/or other storage mechanisms.

While the invention has been described in conjunction with the specific embodiments outlined above, it is evident that many alternatives, modifications, and variations will be apparent to those skilled in the art. Accordingly, the preferred embodiments of the invention are intended to be illustrative and not limiting. Various changes may be made without departing from the spirit and the scope of the invention as defined in the following claims.

What is claimed is:

1. A method for providing targeted programming to a user outside of the user's home, the method comprising:
   receiving a user identification associated with a user, the user identification comprising an identifier corresponding to an account number used in a transaction;
   receiving reception site information to identify a user action and a site at which the user action is taking place;
   capturing additional user information from the identified user action and the reception site information;
   updating a user profile to include the captured additional user information;
   receiving the updated user profile based upon the user identification and the additional user information, the user profile including information characteristic of the user;
   processing the updated user profile to provide user determinations regarding user actions;
   selecting a targeted program based on the reception site information and the updated user profile and the user determinations, and
   providing the targeted program for presentation to a user outside of the user's home.

2. The method of claim 1, wherein the method is implemented by obtaining the user profile from a database.

3. The method of claim 1, wherein the method is implemented by obtaining the user profile from a device selected from the group consisting of: memory and data storage device.

4. The method of claim 1, wherein the method is implemented by utilizing a controller to perform one or more functions selected from the group consisting of: receiving the user identification, obtaining the user profile, selecting the program, and providing the program.

5. The method of claim 1, wherein the user identification is associated with a single user.

6. The method of claim 1, wherein the user identification is associated with a group including the user.

7. The method of claim 1, wherein the method is implemented by utilizing a user interface device to receive the user identification.

8. The method of claim 1, the method further comprises transmitting the program to a presentation device.

9. The method of claim 8, wherein the program is transmitted over at least one medium selected from the group consisting of: wireless transmission system, analog television broadcast, digital television broadcast) analog radio broadcast, digital radio broadcast, analog wireless communication network, digital wireless communication network, microwave system, millimeter wave system, infrared system, satellite transmission system, wire based transmission system, analog cable system, digital cable t system, coaxial connection, fiber optic link, telephone system, closed circuit system, Very high speed Digital Subscriber Lines, VUD, stand-alone system for providing pre-recorded programs, network connection, Internet, private network, public network, wireless network, wired network, ATM network, wide area network, local area network, intranet and extranet.

10. The method of claim 8, wherein the program is transmitted via streaming program segments.

11. The method of claim 1, wherein the program is obtained from one or more devices selected from the group consisting of a memory and a data storage device.

12. The method of claim 1, wherein the method further comprises generating the program.

13. The method of claim 12, wherein the program is generated in real time.

14. The method of claim 1, wherein the method further comprises presenting the program utilizing a presentation device including a user identification component and an output component.

15. The method of claim 1, wherein the user identification and the user profile is received from a user identification device.

16. The method of claim 15, wherein said user identification device includes one or more devices selected from the group consisting of: wireless receiver, magnetic card reader, smart card reader, optical reader, optical scanner, barcode scanner, video camera, keyboard, keypad, touch screen, voice activated control interface, fingerprint scanner, voice recognition circuit, retina scanner and biometrics identifier device.

17. The method of claim 1, wherein the program is provided to a user via at least one presentation device selected from the group consisting of:
speaker, printer, television, borne theater system, video screen, computer workstation, personal computer, laptop computer, audio system, radio, audio playback device, MP3 player, gaming console, personal digital assistant; set-top box, telephony device, wireless telephony device, wireless device, an Internet-enabled telephone, pager, web phone, web pad, web tablet, virtual reality system, heads-up display, and tactile or sensory perceptible signal generator.

18. The method of claim 1, wherein the program is provided to a user via a presentation device that is a stand-alone unit.

19. The method of claim 1, wherein the program is provided to a user via a presentation device that includes communication hardware and software to allow the user to connect a user device for receiving the programming.

20. The method of claim 19, wherein the program is provided to the user device via at least one medium selected from the group consisting of:
wireless transmission system, analog television broadcast, digital television broadcast, analog radio broadcast, digital radio broadcast, analog wireless communication network, digital wireless communication network, microwave system, millimeter wave system, infrared system, satellite transmission system, wire based transmission system, analog cable system, digital cable system, coaxial connection, fiber optic link, telephone system, closed circuit system, Very high speed Digital Subscriber Lines, VGD, stand-alone system for providing pre-recorded programs, network connection, Internet, private network, public network, wireless lo network, wired network, ATM network, wide area network, local area network, intranet and extranet.

21. The method of claim 1, wherein the program includes at least one form of programming selected from the group consisting of: advertising, entertainment programming, educational programming, informative programming, television programming, radio programming, motion picture programming, video game programming, video programming, audio programming, live programming, pre-recorded programming, sports programming, music programming, music video programming, game show programming, news programming, and non-commercial programming.

22. The method of claim 1, wherein the program includes at least one format selected from the group consisting of: video, audio, still frame pictures, graphics, textual information, animations, multimedia, slow frame video data, video stills, sequences of individual frames, virtual reality data, live data, pre-recorded data and computer generated data.

23. A system for presenting targeted programming to a user outside of the user's home comprising:
a user interface device that obtains user identification information including an account number used in a transaction and reception site information to identify a user action and a site at which the user action is taking place and additional user information from the identified user action and reception site information;
a controller that receives the user identification information including an account number used in a transaction and reception site information to identify a user action and a site at which the user action is taking place and that updates a user profile to include the additional user information, processes the undated user profile to provide determinations regarding user actions, and selects a targeted program based on the user identification information and the reception site information, the additional user information, and the determinations; and
a presentation device that receives the targeted program for presentation to a user outside of the user's home.

24. The system of claim 23, wherein the controller transmits the program to the presentation device.

25. The system of claim 23, wherein the controller provides the program to the presentation device over a communications link.

26. The system of claim 23, wherein the controller provides the program to the presentation device over at least one medium selected from the group consisting of; wireless transmission system, analog television broadcast, digital television broadcast analog radio broadcast digital radio broadcast, analog wireless communication network, digital wireless communication network, microwave system, millimeter wave system, infrared system, satellite transmission system, wire based transmission system, analog cable system, digital cable system, coaxial connection, fiber optic link, telephone system, closed circuit system, Very high speed Digital Subscriber Lines, VGD, stand-alone system for providing pre-recorded programs, network connection, Internet, private network, public network, wireless lo network, wired network, ATM network, wide area network, local area network, intranet and extranet.

27. The system of claim 23, wherein the controller provides the program via streaming program segments.

28. The system of claim 23, wherein the controller selects the program from at least one source selected from the group consisting of: a network, a satellite feed, a memory, a server and a data storage device.

29. The system of claim 23, wherein the controller provides the program via a network.

30. The system of claim 23, wherein the controller selects a program generated by the controller itself.

31. The system of claim 30, wherein the controller generates the program In real time.

32. The system of claim 23 wherein the controller obtains a user profile associated with the user identification.

33. The system of claim 32, wherein the controller obtains the user profile from at least one source selected from the group consisting of: a memory. database, a data storage device, a server and a network.

34. The system of claim 32, wherein at least one of the user identification and the user profile is located on the presentation device.

35. The system of claim 32, further comprising a user identification device that provides at least one of the user identification and the user profile to the user interface device.

36. The system of claim 32, further comprising a second presentation device.

37. The system of claim 36, wherein the controller is adapted to select a second program for the second presentation device based at least in part on at least one of a second user identification and a second user profile.

38. The system of claim 23, wherein the controller is a hub.

39. The system of claim 23, wherein the presentation device is located at a fixed reception site.

40. The system of claim 39, wherein the program is stored at the reception site.

41. The system of claim 23, wherein the controller and the presentation device are connected via a wireless connection.

42. The system of claim 23, wherein the program is stored on the presentation device.

43. The system of claim 23, further comprising a user identification device selected from the group consisting of: wireless receiver, magnetic card reader, smart card reader, optical reader, optical scanner, barcode scanner, video camera, keyboard, keypad, touch screen, voice activated control interface, fingerprint scanner, voice recognition circuit, retina scanner and biometric identifier device.

44. The system of claim 23, wherein the presentation device includes at least one device selected from the group consisting of: speaker, printer, television, home theater system, video screen, computer workstation, personal computer, laptop computer, audio system, radio, audio playback device, MP3 player, gaming console, personal digital assistant, set-top box, telephony device, wireless telephony device, wireless device, pager, web phone, web pad, web tablet, virtual reality system, heads-tip display, and tactile or sensory perceptible signal generator.

45. The system of claim 23, wherein the presentation device is a stand-alone unit.

46. The system of claim 23, wherein the presentation device is connected to a user device, the user device being configured for receiving the programming.

47. The system of claim 46, wherein the presentation device is connected to the user device via one or more medium selected from the group consisting of: wireless transmission system, analog television broadcast, digital television broadcast, analog radio broadcast, digital radio broadcast, analog wireless communication network, digital wireless communication network, microwave system, millimeter wave system, infrared system, satellite transmission system, Wire based transmission system, analog cable system, digital cable system, coaxial connection, fiber optic link, telephone system, closed circuit system, very high speed Digital Subscriber Lines, VGD, stand-alone system for providing pre-recorded programs, network connection, Internet, private network, public network, wireless network, wired network, ATM network, wide area network, local area network, intranet and extranet.

48. A system for presenting targeted programming to a user outside of the user's home comprising:
    an input device that receives a user identification comprising an identifier corresponding to an account number used in a transaction and receives reception site information to identify a user action and a site at which the user action is taking place and additional user information from the identified user action and reception site information;
    a user profile database including user profile information;
    a controller that obtains the user identification, the reception site information, the additional user information, and the user profile information to create an undated group profile information for a group of users and that further provides determinations regarding user actions and selects a targeted program based on the updated group profile information and the determinations; and
    a presentation device connected to the controller, the presentation device being adapted to present the targeted program to the group of users outside of the users' homes.

49. The system of claim 48, wherein the controller comprises a local hub.

50. The system of claim 48, wherein the input device, the controller and the presentation device are located at a single reception site.

51. The system of claim 48, wherein the controller transmits the program to the presentation device.

52. The system of claim 48, wherein the controller provides the program to the presentation device.

53. The system of claim 52, wherein the controller transmits the program to the presentation device via a communications link.

54. The system of claim 52, wherein the controller provides the program to the presentation device over at least one medium selected from the group consisting of: wireless transmission system, analog television broadcast, digital television broadcast, analog radio broadcast, digital radio broadcast, analog wireless communication network, digital wireless communication network, microwave system, millimeter wave system, infrared system, satellite transmission system, wire hazed transmission system, analog cable system, digital cable system, coaxial connection, fiber optic link, telephone system, closed circuit system, Very high speed Digital Subscriber Lines, VOD, stand-alone system for providing pre-recorded programs, network connection, Internet, private network, public network, wireless lo network, wired network, ATM network, wide area network, local area network, intranet and extranet.

55. The system of claim 52, wherein the controller provides the program via streaming program segments.

56. The system of claim 48, wherein the controller selects the program from at least one source selected from the group consisting of: a network, a satellite feed, a memory, a sewer and a data storage device.

57. The system of claim 48, wherein the controller generates the program.

58. The system of claim 57, wherein the controller generates the program in real time.

59. The system of claim 48, wherein the controller obtains the user profile from one or more sources selected from the group consisting of: a memory, a database, a data storage device, a server and a network.

60. The system of claim 48, wherein the controller selects the program based at least in part on the user profile.

61. The system of claim 48, wherein the presentation device is located at a fixed reception site.

62. The system of claim 48, wherein the controller and the presentation device are connected via a wireless connection.

63. The system of claim 62, wherein at least one of the user identification and the user profile is located on the presentation device.

64. The system of claim 48, further comprising a user identification device that provides the user identification.

65. The system of claim 48, wherein the presentation device includes at least one device selected from the group consisting of: speaker, printer, television, home theater system, video screen, computer workstation, personal computer, laptop computer, audio system, radio, audio playback device, MP3 player, gaming console, personal digital assistant, set-top box, telephony device, wireless telephony device, wireless device, pager, web phone, web pad, web tablet, virtual reality system, heads-up display, and tactile or sensory perceptible signal generator.

66. The system of claim 48, wherein the presentation device is a stand-alone unit.

67. The system of claim 48, wherein the presentation device includes communication hardware and software to allow the user to conned a user device for receiving the program.

68. The system of claim 48, further comprising a second presentation device.

69. The system of claim 68, wherein the controller is adapted to select a second program for the second presentation device based on at least one of a second user identification and a user profile.

70. An article of manufacture comprising:
    a computer readable medium having computer readable program code means for causing a computer to;
    receive a user identification associated with a user, the user identification comprising an identifier corresponding to an account number used in a transaction;
    receive reception site information to identify a user action and a site at which the user action is taking place;
    capture additional user information from the identified user action and the reception site information;
    update a user profile to include the captured additional user information;
    obtain the updated user profile associated with the user identification and the additional user information, the user profile including information characteristic of the user;
    process the updated user profile to provide user determinations regarding user actions;
    select a targeted program based on the reception site information and the updated user profile and the user determinations; and
    provide the targeted program for presentation to a user outside of the user's home.

71. A computer data signal encoded with computer executable instructions embodied in a transmission medium comprising:
    a code segment including a user identification associated with a user, the user identification comprising an identifier corresponding to an account number used in a transaction;
    a code segment including reception site information to identify a user action and a site at which the user action is taking place;
    a code segment including additional user information from the identified user action ad the reception site information;
    a code segment including an undated user profile associated with the user identification and the additional user information, the user profile including information characteristic of the user;
    a code segment including user determinations regarding user actions; and
    a code segment including a targeted program for presentation to a user outside of the user's home, the targeted program being selected based on the reception site information, the user determinations, and the undated user profile.

72. A system for presenting targeted information to a user outside of the user's home comprising:
    a means for receiving a user identification associated with a user, the user identification comprising an identifier corresponding to an account number used in a transaction;
    a means for receiving reception site information to identify a user action and a site at which the user action is taking place;
    a means for capturing additional user information from the identified user action and the reception site information;
    a means for updating a user profile to include the captured additional user information;
    a means for receiving the updated user profile based upon the user identification and the additional user information, the user profile including information characteristic of the user;
    a means for processing the undated user profile to provide user determinations regarding user actions;
    a means for selecting a targeted program based on the reception site information and the updated user profile and the user determinations; and
    a means for presenting the targeted program to a user outside of the user's house.

* * * * *